US008370643B2

(12) United States Patent
Miyazaki et al.

(10) Patent No.: US 8,370,643 B2
(45) Date of Patent: Feb. 5, 2013

(54) CRYPTOGRAPHIC MODULE SELECTING DEVICE AND PROGRAM

(75) Inventors: Shingo Miyazaki, Fuchu (JP); Takanori Nakamizo, Chofu (JP); Akito Niwa, Mitaka (JP); Koji Okada, Tokyo (JP); Kouya Tochikubo, Yokohama (JP); Shigeyuki Fukushima, Fuchu (JP); Chiaki Ishikawa, Tokyo (JP); Noboru Koshizuka, Tokyo (JP); Ken Sakamura, Tokyo (JP)

(73) Assignees: Toshiba Solutions Corporation, Tokyo (JP); Yokosuka Telecom Research Park, Inc., Yokosuka-shi (JP)

( * ) Notice: Subject to any disclaimer, the term of this patent is extended or adjusted under 35 U.S.C. 154(b) by 934 days.

(21) Appl. No.: 12/237,656

(22) Filed: Sep. 25, 2008

(65) Prior Publication Data

US 2010/0281270 A1 Nov. 4, 2010

(30) Foreign Application Priority Data

Sep. 28, 2007 (JP) ................................. 2007-256317

(51) Int. Cl.
*G06F 11/30* (2006.01)
*G06F 12/14* (2006.01)
*G06F 15/16* (2006.01)
(52) U.S. Cl. ........................... 713/191; 709/228; 380/28
(58) Field of Classification Search .................. 713/191; 709/228; 380/28
See application file for complete search history.

(56) References Cited

U.S. PATENT DOCUMENTS

| 5,933,503 | A | * | 8/1999 | Schell et al. ................... 713/189 |
| 6,249,866 | B1 | * | 6/2001 | Brundrett et al. ............. 713/165 |
| 6,532,451 | B1 | * | 3/2003 | Schell et al. .................... 705/54 |
| 6,701,433 | B1 | * | 3/2004 | Schell et al. ................... 713/164 |
| 6,751,735 | B1 | * | 6/2004 | Schell et al. ................... 713/189 |
| 6,785,811 | B1 | * | 8/2004 | Bihlmeyer et al. ............ 713/167 |
| 6,976,176 | B1 | * | 12/2005 | Schier .............................. 726/11 |

(Continued)

FOREIGN PATENT DOCUMENTS

| JP | 2001-325172 | 11/2001 |
| JP | 2002-175187 | 6/2002 |

(Continued)

OTHER PUBLICATIONS

Electronic government recommendation code list, The Ministry of Public Management & the Ministry of Economy, Trade and Industry, Feb. 20, 2003, 3 pages.

(Continued)

*Primary Examiner* — Christian Laforgia
(74) *Attorney, Agent, or Firm* — Oblon, Spivak, McClelland, Maier & Neustadt, L.L.P.

(57) ABSTRACT

A cryptographic module selecting device includes a cryptographic module evaluation information storage device configured to store identification information of a cryptographic module and cryptographic module evaluation information describing a function and/or performance of the cryptographic module in relation to each other, a condition information acquiring device configured to acquire condition information for specifying the condition of the cryptographic module to be selected, an extracting device configured to extract cryptographic module evaluation information conforming to the acquired condition information, from the stored cryptographic module evaluation information of the cryptographic module, and an output device configured to read out the identification information of the cryptographic module corresponding to the cryptographic module evaluation information selected by the extracting device from the cryptographic module evaluation information storage device and output the read identification information.

9 Claims, 21 Drawing Sheets

U.S. PATENT DOCUMENTS

| | | | |
|---|---|---|---|
| 7,079,655 B1 * | 7/2006 | Tochikubo et al. | 380/281 |
| 7,096,357 B1 * | 8/2006 | Tochikubo et al. | 713/164 |
| 7,313,234 B2 * | 12/2007 | Takagaki et al. | 380/28 |
| 7,383,442 B2 * | 6/2008 | Schell et al. | 713/188 |
| 8,009,833 B2 * | 8/2011 | Uchikawa | 380/255 |
| 2002/0019935 A1 * | 2/2002 | Andrew et al. | 713/165 |
| 2002/0078348 A1 * | 6/2002 | Leung et al. | 713/164 |
| 2003/0130961 A1 * | 7/2003 | Moret De Rocheprise | 705/78 |
| 2004/0107237 A1 * | 6/2004 | Kashiwada | 709/200 |
| 2006/0034459 A1 * | 2/2006 | Uchikawa | 380/255 |
| 2009/0129586 A1 * | 5/2009 | Miyazaki et al. | 380/28 |
| 2009/0138699 A1 * | 5/2009 | Miyazaki et al. | 713/150 |
| 2009/0138700 A1 * | 5/2009 | Miyazaki et al. | 713/150 |
| 2009/0138708 A1 * | 5/2009 | Miyazaki et al. | 713/168 |
| 2009/0327697 A1 * | 12/2009 | Liu | 713/151 |

FOREIGN PATENT DOCUMENTS

| | | |
|---|---|---|
| JP | 2002-281018 | 9/2002 |
| JP | 2005-242631 | 9/2005 |
| JP | 2006-339847 | 12/2006 |
| JP | 2007-213585 | 8/2007 |

OTHER PUBLICATIONS

The Document of Selection/Design/Evaluation for Common Key Block Ciphers, National Institute of Information and Communications Technology, Jun. 2000, 107 pages.

Japanese Office Action mailed Jun. 5, 2012, in Japanese Patent Application No. 2007-256317 filed Sep. 28, 2007 (with English Translation).

* cited by examiner

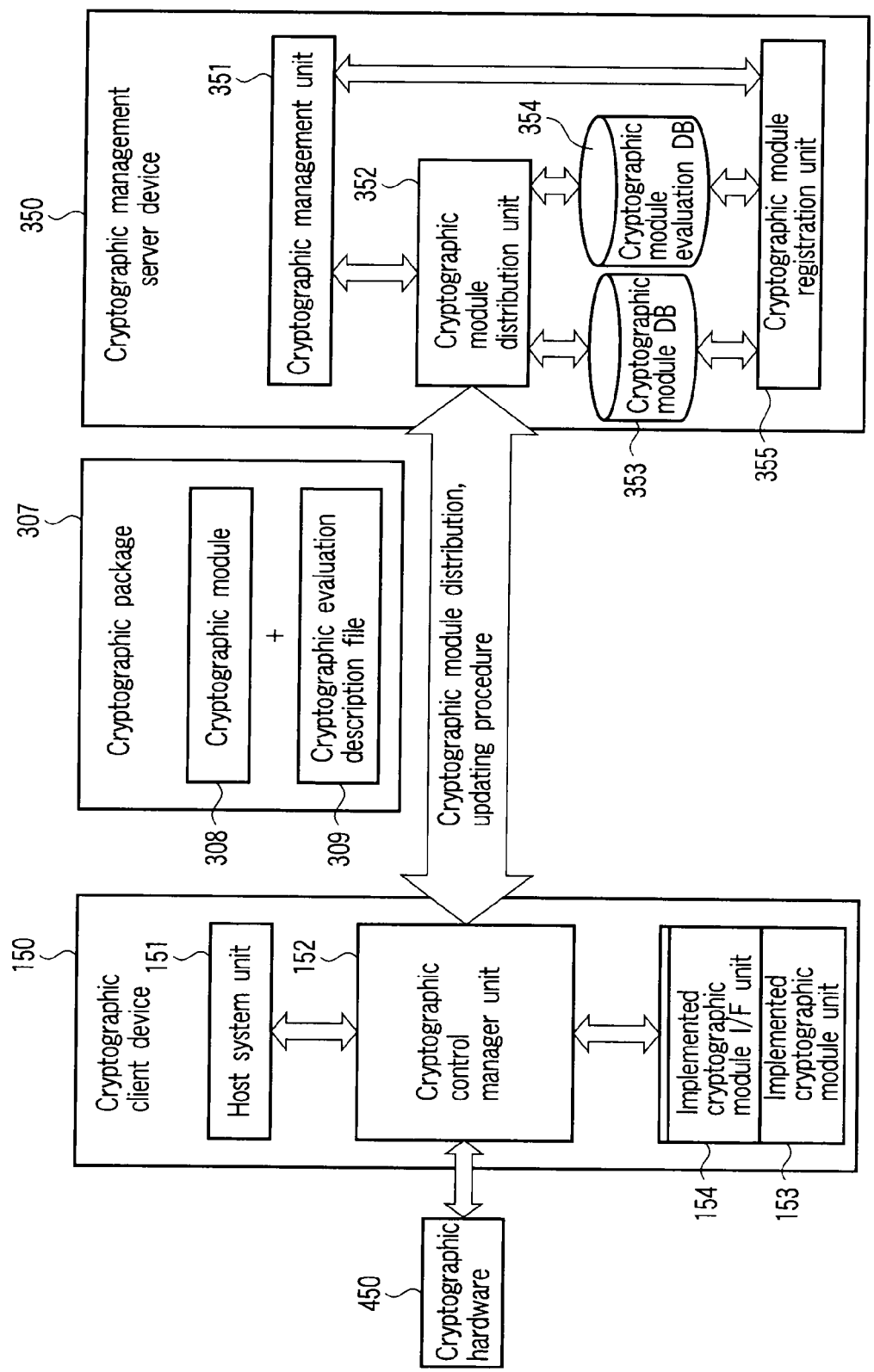
F I G. 1

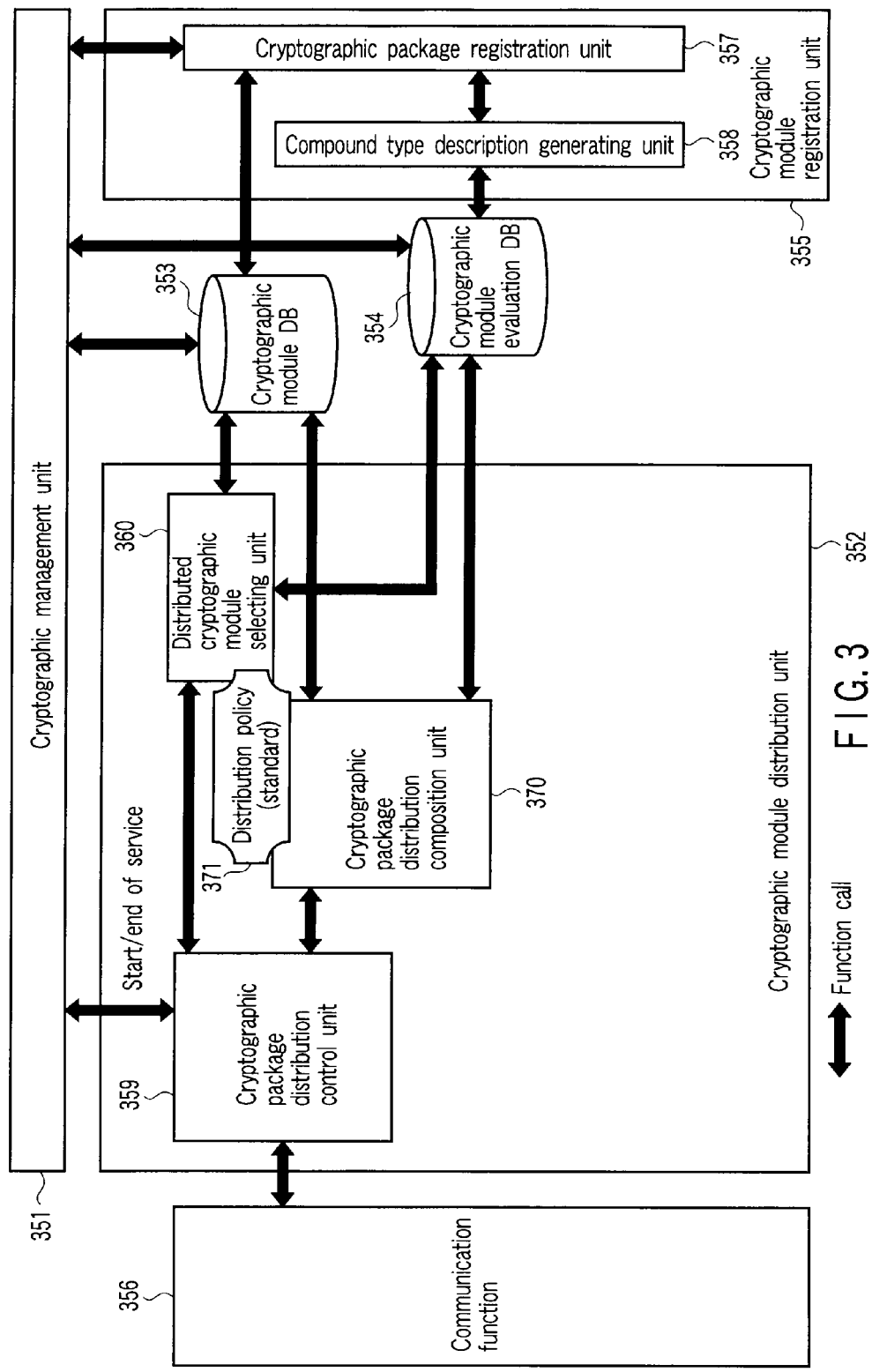
F I G. 3

| [KEY] Policy (condition information of cryptographic module including category information described in character string) | |
|---|---|
| Uppermost cryptographic evaluation description unit ID | Uppermost cryptographic evaluation description unit ID of encryption module corresponding to the policy |
| Algorithm ID | Algorithm ID corresponding to the policy |
| Number of cryptographic modules to be linked | Number of end cryptographic modules corresponding to the policy |
| Cryptographic module ID group to be linked | End cryptographic module IDs corresponding to the policy (a plurality) |
| Key length | Length of cipher key used in execution of cryptographic process. |

F I G. 6

| [KEY] Cryptographic evaluation description unit ID | |
|---|---|
| Cryptographic evaluation description unit ID with version number | Cryptographic evaluation description unit ID including version number |
| Cryptographic module ID | Corresponding implemented cryptographic module unit ID in the case of cryptographic evaluation description unit at end of tree structure; otherwise, NULL |
| Category ID | Category ID of this cryptographic evaluation description unit |
| Number of references of own cryptographic evaluation description unit | Counted number of reference sources of this cryptographic evaluation description unit (there are two reference sources : selection DB and this cryptographic module link DB) |
| Number of cryptographic evaluation description units to be linked | Number of cryptographic evaluation description units lower than this cryptographic evaluation description unit in tree structure |
| Cryptographic evaluation description unit ID to be linked | Cryptographic evaluation description unit ID lower than this cryptographic evaluation description unit in tree structure |

F I G. 7

| | |
|---|---|
| [KEY] Cryptographic evaluation description unit ID | |
| Cryptographic evaluation description unit ID with version number | Cryptographic evaluation description unit ID including version number |
| Linked cryptographic evaluation description unit ID | Cryptographic evaluation description unit ID at end corresponding to this cryptographic module |
| Category ID | Category ID of this cryptographic module |
| Cryptographic module data number | Data number for this cryptographic module |
| Module type | Type of this cryptographic module |
| Cryptographic module file name | File name of this cryptographic module |
| Number of selection policies to be linked | Number of policies in selection DB related with this cryptographic module |
| Policy group of selection DB to be linked | Policies in selection DB related with this cryptographic module |

F I G. 8

| | |
|---|---|
| [KEY] Key ID | |
| Storage place information | Information about storage place (none, in terminal, in cryptographic hardware) |
| Key type | Information about key type (key data, algorithm specific parameter, system specific parameter, certificate) |
| Key file name | File name of key |
| Key entity | Key entity data |
| Key data encryption information | Information about key data encryption information (no encrypting, use of cryptographic hardware) |
| Key length, parameter length | Length information of key and parameter |
| Category ID | Category ID corresponding to this key |
| Algorithm ID | Algorithm ID corresponding to this key |
| Author | Information about author of this key |
| Period of use | Information about usable period of this key |
| Limited number of use | Information about limited number of times of use of this key |

F I G. 9

| [KEY] Cryptographic process ID | |
|---|---|
| Process type | Information about process type (including key addition, key generation, cryptographic process) |
| Algorithm ID | Algorithm ID of the corresponding process |
| Cryptographic evaluation description ID | Cryptographic evaluation description ID utilized as cryptographic process or key generation process |
| Category ID | Category ID of the corresponding process |
| Indirect reference key ID | Key ID in indirectly referenced key DB |
| Number of parameters | Number of parameter information groups |
| Parameter information group | Information including type and size of parameter, in addition to parameter main body |
| Key information group | Information including key parameter type, key ID, and key size |

F I G. 10

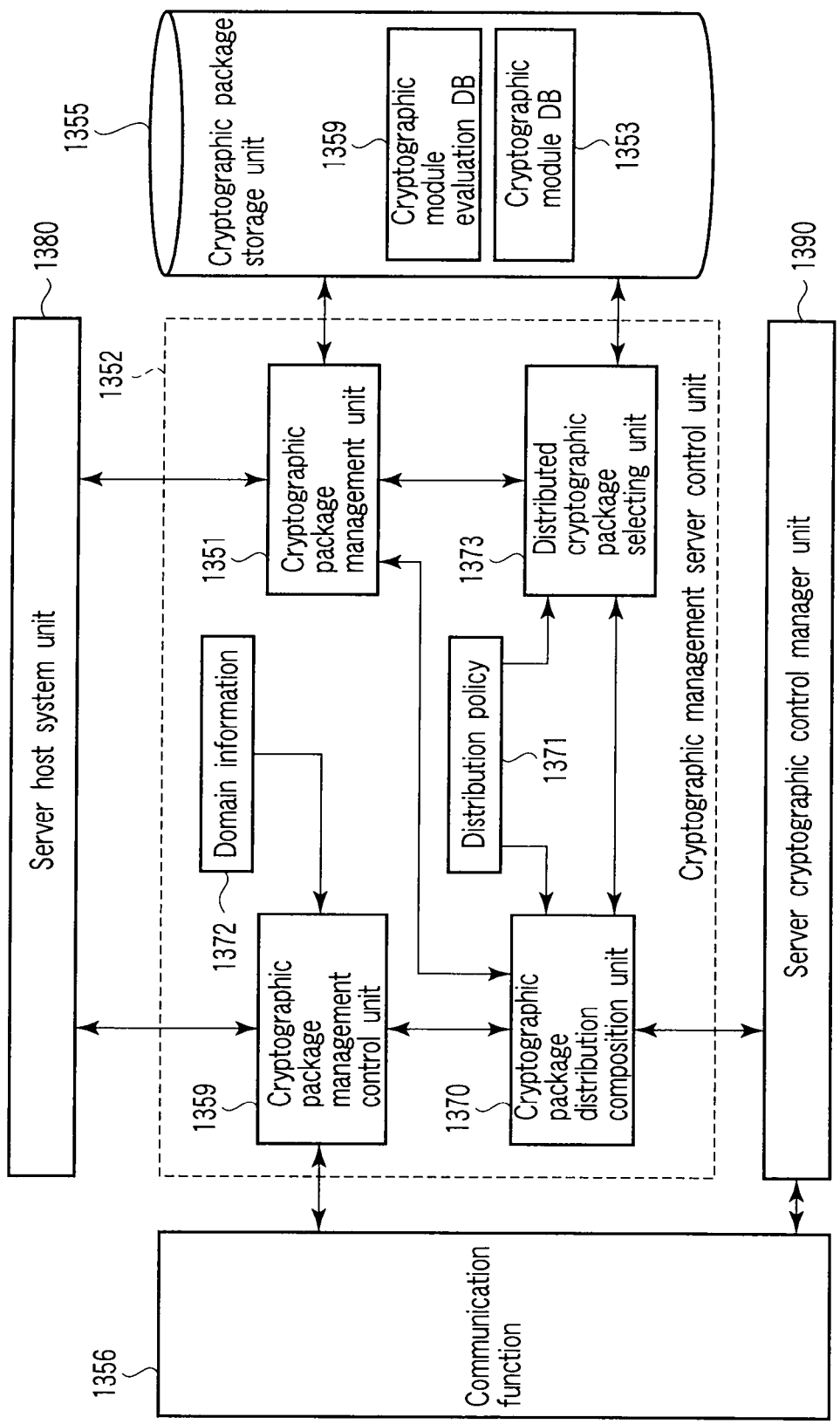
F I G. 12

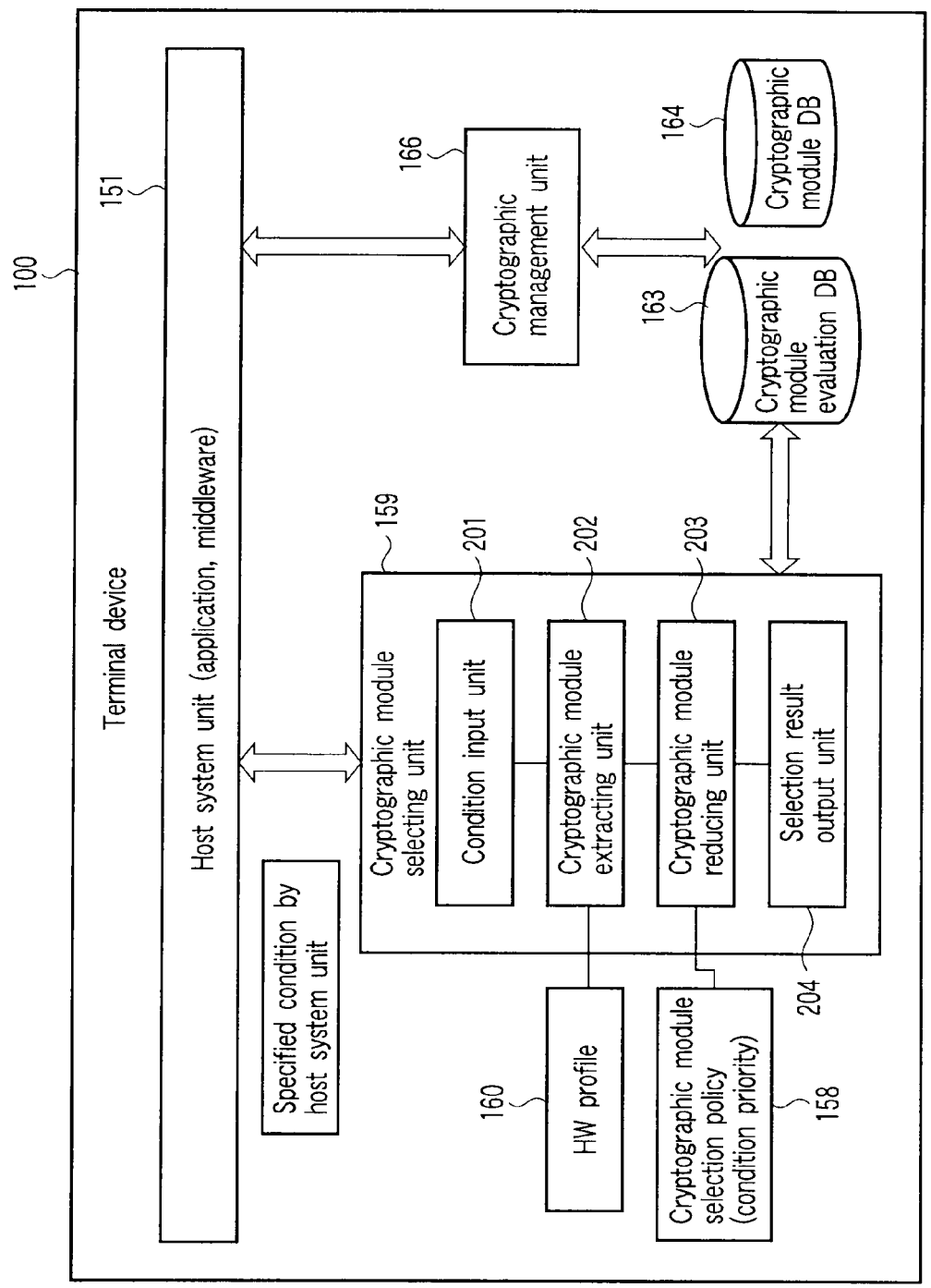
F I G. 13

F I G. 14

| Description item | Outline |
|---|---|
| Cryptographic evaluation information ID | Number for identifying unique cryptographic evaluation information |
| Cryptographic algorithm ID | Number for identifying unique cryptographic algorithm |
| Cryptographic module ID | Number for identifying unique cryptographic module ; including execution environment, author name, revision |
| Security | Score based on external evaluation; including the evaluating examiner, evaluating date |
| Speed | Score based on best value of cryptographic module |
| Resource usage | Size of use of RAM |
| Condition of use | Key length lower limit, combination with other cryptographic module, application of use |
| Support function | Supported key length/input length/output length/mode (standard, etc.) |
| Category | Category to which this encryption module belongs |
| Function dependent category | List of function categories necessary in this cryptographic module |
| Date of creation | Creation date/final updating date of cryptographic evaluation information/encryption module, creation date of corresponding cryptographic algorithm |
| Author | Name of vendor developing this cryptographic module |
| Distributor | Name of distributor distributing this cryptographic module |
| Digest value of Cryptographic module main body | Link between this cryptographic module and main body; including hash ID |
| Approval authenticator | Signature/MAC of author/distributor; including identifier of approval authenticator |
| Class (future problem) | Classification according to purpose of use of application |

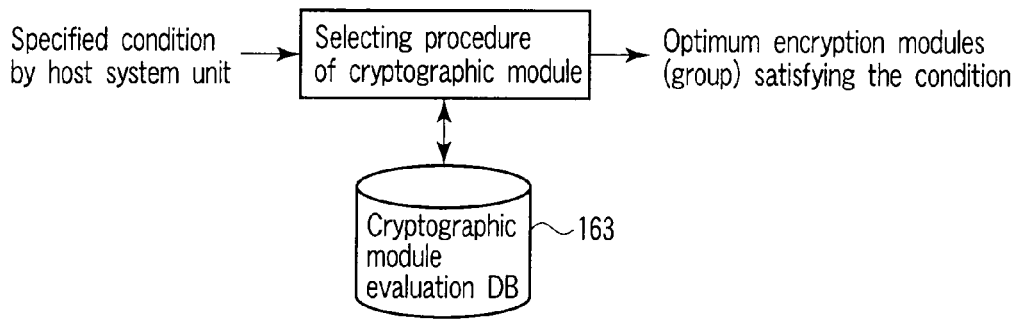
F I G. 16
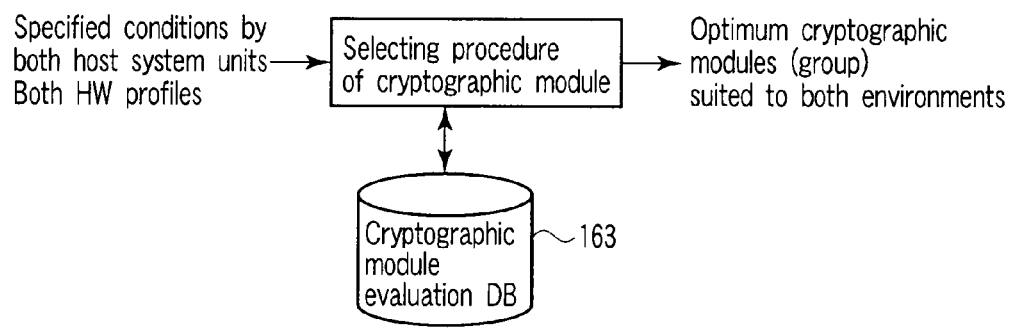
F I G. 19

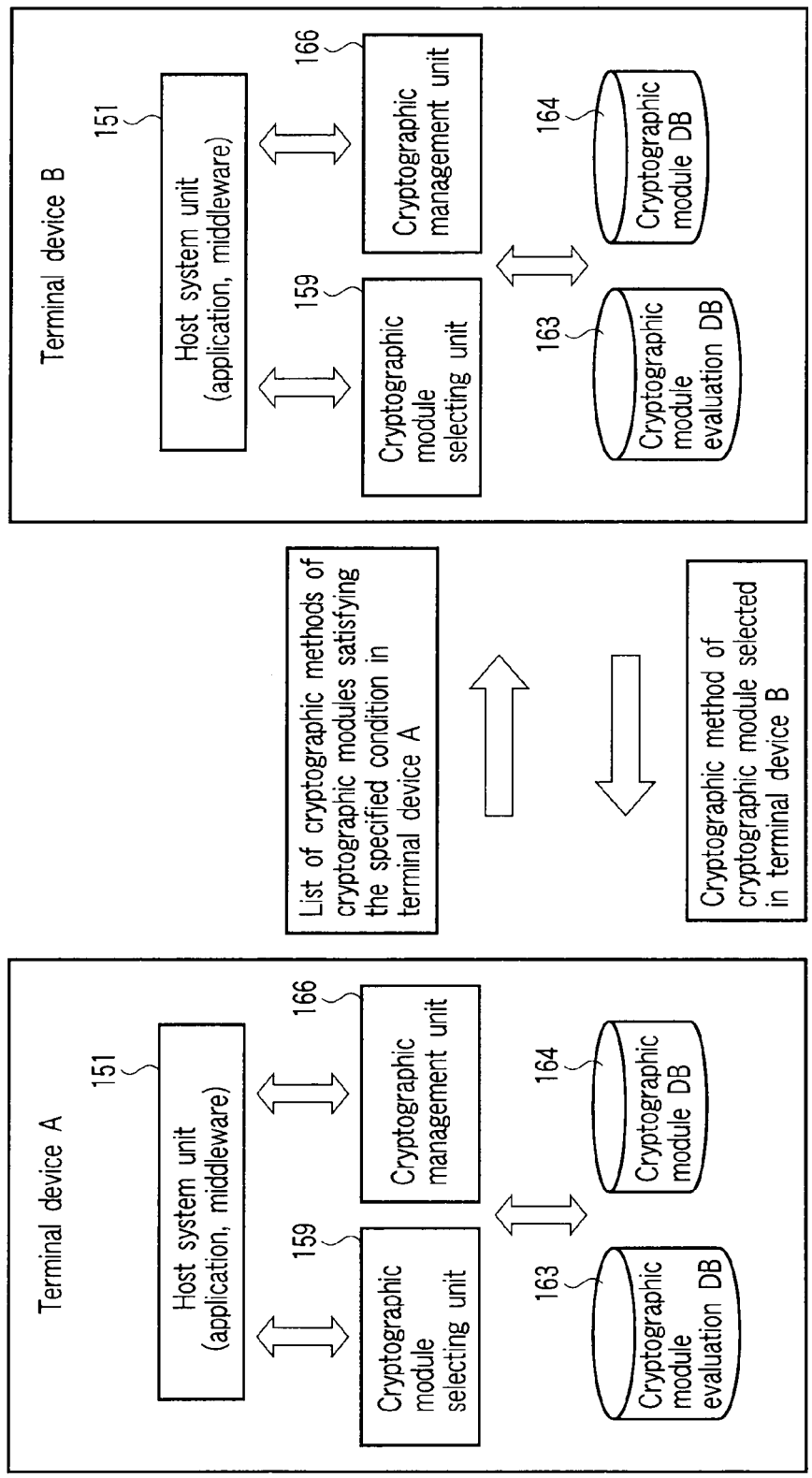
F I G. 17

US 8,370,643 B2

CRYPTOGRAPHIC MODULE SELECTING DEVICE AND PROGRAM

CROSS-REFERENCE TO RELATED APPLICATIONS

This application is based upon and claims the benefit of priority from prior Japanese Patent Application No. 2007-256317, filed Sep. 28, 2007, the entire contents of which are incorporated herein by reference.

BACKGROUND OF THE INVENTION

1. Field of the Invention

The present invention relates to a cryptographic module selecting device and program for selecting a cryptographic scheme for encrypting and signing electronic data.

2. Description of the Related Art

In the present highly information-oriented society, a cryptographic technology is employed as a basic technology for assuring security of information.

The cryptographic technology is roughly classified into the categories of common-key cryptosystem, public-key cryptosystem, hash function, random number, and the like. In each category, various cryptographic methods have been developed. Each cryptographic method has particular features. Therefore, it is desired to select an appropriate cryptographic method depending on the circumstances by considering the features of the cryptographic methods.

When changing the encrypting method, a technology for reflecting the changed cryptographic method in the system is disclosed, for example, in Jpn. Pat. Appln. KOKAI Publication No. 2002-281018.

One of the guidelines for selecting the cryptographic method is shown, for example, in CRYPTREC, e-government recommended cipher list (URL: http://www.soumu.go.jp/joho_tsusin/security/pdf/cryptre c_01.pdf). When selecting a common-key cryptosystem, for example, knowledge of the content of the document concerning selection/design/evaluation of common-key block cipher, written by the Communication and Broadcasting Organization (URL: http://www2.nict.go.jp/tao/kenkyu/yokohama/guidebook.pdf), is advised.

However, the e-government recommended cipher list shows sets of cryptographic methods generally used, but does not always show the optimum cryptographic method according to the circumstances.

To select a common-key cryptographic method, professional knowledge is needed because it is selected through an understanding of, for example, the document concerning selection/design/evaluation.

Also, by finding a novel attacking method of an existing cryptographic method, it may be required to modify the existing cryptographic method to provide a new cryptographic method.

Further, in one cryptographic method, a plurality of cryptographic modules mutually different in the implementing manner may exist. Hence, depending on the implementing manner, the speed of the cryptographic module or the consumption amount of resources may be different. Accordingly, depending on the circumstances, it may be needed to change a current cryptographic module to a different cryptographic module of the same cryptographic method.

In any case, when changing over the cryptographic modules, it is proposed to distribute a cryptographic module for executing a new cryptographic method to the corresponding device to update the cryptographic module (see, for example, Jpn. Pat. Appln. KOKAI Publication No. 2002-281018). However, in Jpn. Pat. Appln. KOKAI Publication No. 2002-281018, optimum selection of cryptographic module is not suggested.

Thus, conventionally, the cryptographic module is used as a fixed one, and when changing over the cryptographic modules, professional knowledge is needed to select the optimum cryptographic module that suits the circumstances.

BRIEF SUMMARY OF THE INVENTION

It is hence an object of the invention to present a cryptographic module selecting device and program for selecting the optimum cryptographic method or cryptographic module according to circumstances without having professional knowledge.

The invention generally has the following configuration. That is, a "cryptographic module selecting procedure" is built up, which is an algorithm of relating a cryptographic module with cryptographic evaluation information describing functions and properties of the cryptographic module, and producing the following outputs by referring to these data depending on the specified conditions.

1) A list of cryptographic modules suited to the specified conditions is compiled.

Herein, the cryptographic module dependent relation and restricting conditions are described in the cryptographic evaluation information, and used when compiling a list.

2) The optimum cryptographic module is selected from the conformity list of 1) depending on the degree of priority of the specified conditions.

Herein, the score of the cryptographic module is evaluated with respect to properties specified in the conditions, and the evaluation result is described in the cryptographic evaluation information, and is used when selecting a cryptographic module.

This operation is utilized not only when selecting the cryptographic module to be used in the own machine, but also when selecting a cryptographic module optimum for the hardware of a terminal device by a server.

In one aspect of the present invention, there is provided a cryptographic module selecting device which selects any one of a plurality of cryptographic modules, comprising: a cryptographic evaluation information storage device configured to store identification information of a cryptographic module for executing a cryptographic method and cryptographic evaluation information describing either one or both of a function and performance corresponding to the cryptographic module in relation to each other; a condition information acquiring device configured to acquire condition information for specifying the condition of the cryptographic module to be selected; an extracting device configured to extract cryptographic evaluation information conforming to the condition information acquired by the condition information acquiring device, from the cryptographic evaluation information stored in the cryptographic evaluation information storage device; and an output device configured to read out the identification information of the cryptographic module corresponding to the cryptographic evaluation information selected by the extracting device from the cryptographic evaluation information storage device and output the read identification information.

BRIEF DESCRIPTION OF THE SEVERAL VIEWS OF THE DRAWING

FIG. 1 is a block diagram showing a configuration of a cryptographic module distribution system in a first embodiment of the invention;

FIG. 3 is a block diagram showing a configuration of a cryptographic management server device in the same embodiment;

FIG. 6 is a diagram showing a data composition example of a selection DB in the same embodiment;

FIG. 7 is a diagram showing a data composition example of a cryptographic module link DB in the same embodiment;

FIG. 8 is a diagram showing a data composition example of a cryptographic module DB in the same embodiment;

FIG. 9 is a diagram showing a data composition example of a key information DB in the same embodiment;

FIG. 10 is a diagram showing a data composition example of a cryptographic process DB in the same embodiment;

FIG. 12 is a block diagram showing a configuration of a cryptographic management server device in the same embodiment;

FIG. 13 is a functional block diagram of a cryptographic selecting device in the same embodiment;

FIG. 14 is an example of description items of cryptographic evaluation information in the same embodiment;

FIG. 16 is an example of data input and output to/from the cryptographic module selecting procedure in the same embodiment;

FIG. 17 is a functional block diagram of a cryptographic selecting device in a fourth embodiment of the invention;

FIG. 19 is an example of data input and output to/from the cryptographic module selecting procedure in the same embodiment;

DETAILED DESCRIPTION OF THE INVENTION

Figure 2:
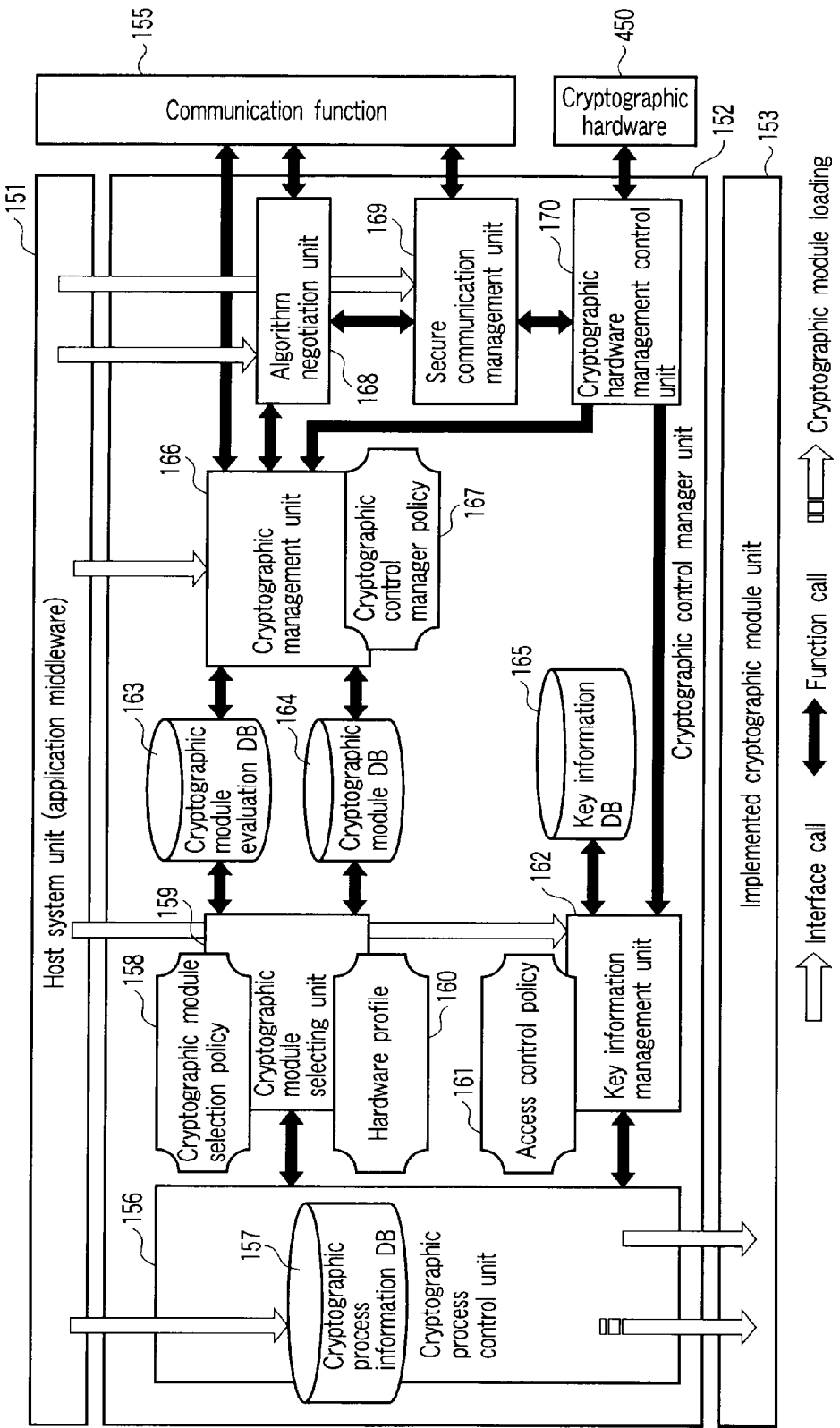
FIG. 2 is a block diagram showing a configuration of a cryptographic client device in the same embodiment.

A cryptographic module distribution system in an embodiment of the invention is described below while referring to the accompanying drawings.

An outline of this system will be given next. In this system, a server and a client device are connected, and information encrypted by using a cryptographic module conforming to a specific cryptographic method can be transmitted and received between the server and the client device. In this system, it is also possible to change over the cryptographic modules periodically. As such cryptographic system capable of changing over the cryptographic modules, there are some frameworks in which an interface is defined according to the cryptographic technique and independent of the cryptographic method and on which each cipher vendor can be implemented. For example, such frameworks include CryptAPI of Microsoft™, JCA (Java™ Cryptographic Architecture)/JCE (Java™ Cryptographic Extensions) of Sun™, and CDSA (Common Data Security Architecture) of Open Group™.

In these frameworks, an interface for accessing each cryptographic module is defined according to the cryptographic technique, such as encryption/decryption, signature generation/verification, and authenticator generation/verification, and the cryptographic method, such as DES (Data Encryption Standard) and AES (Advanced Encryption Standard), can be implemented according to the interface. When a professional of cryptology or security constructs a system, an appropriate cryptographic method is selected in advance from the implemented cryptographic methods, and a cryptographic method parameter indicating which cryptographic method is used is input to the framework, so that the cryptographic methods can be changed over.

Conventionally, when using such a framework, if the security policy in management of an application system is changed, a professional of cryptology or security must reselect a cryptographic method suited to the system, which involves problems of sourcing the appropriate professional cryptology or security personnel and cost. If a defect is found in the existing cryptographic method, or when a new cryptographic method is announced, it is hard to apply the change in cryptographic method smoothly to the application system currently in operation. Further, depending on the environment for assuring the security, if the required security level and the processing speed are different, it is hard to realize the optimum security in the conventional system.

According to the system of the present embodiment, such problems can be solved in the cryptographic system capable of changing over the cryptographic method.

First Embodiment

FIG. 1 is a schematic block diagram showing a configuration of a cryptographic module distribution system in the first embodiment of the invention.

This cryptographic system includes a cryptographic management server device 350 which transmits a cryptographic package 307 containing a cryptographic module 308 and a cryptographic evaluation description file 309, and a cryptographic client device 150 which performs a cryptographic process by using the received cryptographic package 307. Evaluation of the cryptographic module described in the cryptographic evaluation description file 309 concerns numerical information on reliability, strength and the like of a cryptographic method of the corresponding cryptographic module 308, and examples thereof include security of the implemented cryptographic method, processing speed of the cryptographic module, and key length usable in the cryptographic module. The cryptographic evaluation description file 309 is an example of the cryptographic evaluation information, and the cryptographic evaluation information expressed in XML format may be also applied as the cryptographic evaluation description file 309.

The cryptographic management server 350 includes a cryptographic module DB 353 accumulating cryptographic modules 308, a cryptographic evaluation DB 354 accumulating cryptographic evaluation description files 309, a cryptographic management unit 351 for managing the cryptographic module DB 353 and the cryptographic module evaluation DB 354, a cryptographic module registration unit 355 for registering new information in the cryptographic module DB 353 and the cryptographic module evaluation DB 354, and a cryptographic module distribution unit 352 for reading out the optimum cryptographic package 307 from the cryptographic module DB 353 and the cryptographic module evaluation DB 354 for transmission in response to a request from the cryptographic client device 150.

The cryptographic client device 150 includes a host system unit 151 as an application or middleware which fetches and utilizes the cryptographic function presented by an implemented cryptographic module unit 153 by way of a cryptographic control manager unit 152, the cryptographic control manager unit 152 which receives the cryptographic package 307 transmitted from the cryptographic management server device 350 and changes over the cryptographic functions presented from the implemented cryptographic module unit 153, a tamper-resistant cryptographic hardware unit 450 which realizes the cryptographic process by principal cryptographic method as hardware, and the implemented cryptographic module unit 153 which presents cryptographic functions in which the cryptographic module 308 implementing the cryptographic method is executable and usable. The cryptographic management server device 350 transmits an appropriate cryptographic package 307 to the cryptographic client device 150 by executing three procedures of cryptographic module initial registration, distribution and updating, based on a request from the cryptographic client device 150.

Herein, the cryptographic module initial registration is designed to transmit an indispensable cryptographic module 308 securely to the implemented cryptographic module unit 153 from the cryptographic management server device 350, by making use of the cryptographic hardware unit 450 of the cryptographic client device 150 when the cryptographic client device 150 does not have the cryptographic module 308 and the implemented cryptographic module unit 153 is not present.

The cryptographic module distribution is designed to select the appropriate cryptographic module 308 or cryptographic package 307 and transmit a response to the cryptographic client device 150 by the cryptographic management server device 350 in response to a cryptographic process request received from the cryptographic client device 150. The cryptographic process request includes condition information about the cryptographic module, and the condition information includes a classification of the cryptographic method (cryptographic method category) such as encryption or signature generation, the manufacturer of the cryptographic module 308, information on hardware for operating the cryptographic module 308, and cryptographic module evaluation information. The cryptographic module evaluation information may be handled as a file independently of the cryptographic module 308, as cryptographic evaluation description file 309 as in the example of this embodiment.

The cryptographic module updating is designed to transmit a new cryptographic module 308 and to notify that the existing implemented cryptographic module unit 153 is disabled from the cryptographic management server device, including various functions of, for example, registering a new cryptographic module 308, deleting the corresponding cryptographic module 308 using a compromised cryptographic method, discovering a bug in the cryptographic module 308 and updating the existing cryptographic module 308 and the implemented cryptographic module unit 153 executing such cryptographic module 308, updating information stored in the cryptographic module DB 353 or cryptographic module evaluation DB 354 on the cryptographic management server device 350 when the evaluation of the cryptographic method is changed due to an increased computer processing speed or the like, and transmitting the updated information of the cryptographic package 307 to the cryptographic client device 150 periodically or according to a request from the cryptographic client device 150.

FIG. 2 is a detailed configuration diagram of the cryptographic client device 150. The cryptographic control manager unit 152 includes a cryptographic process control unit 156 having a cryptographic process information DB 157, a cryptographic module DB 164, a cryptographic module evaluation DB 163, a cryptographic module selecting unit 159 having a cryptographic module selecting policy 158 and a hardware profile 160, a key information DB 165, a key information management unit 162 having an access control policy 161 describing the access control policy to the key information DB 165, a cryptographic management unit 166 having a cryptographic control manager policy 167, a cryptographic hardware management control unit 170 which communicates with the cryptographic hardware unit 450, a communication function 155 which communicates with the outside, an algorithm negotiation unit 168 associating with the communication function 155, and a secure communication management unit 169 associating with the communication function 155.

The cryptographic process control unit 156 executes a key generation process, key registration process, and cryptographic process according to a cryptographic process call from the host system unit 151.

The cryptographic module DB 164 is a storage unit for storing the cryptographic module 308 received from the cryptographic management server device 350.

The cryptographic module evaluation DB 354 is a storage unit for storing the cryptographic evaluation description file 309 received from the cryptographic management server device 350.

The cryptographic module selecting unit 159 selects the most suitable cryptographic module 308 from the cryptographic modules 308 stored in the cryptographic module DB 164 based on the condition information on cryptographic module including category of cipher, such as encryption or signature generation, manufacturer of the cryptographic module 308, information on the hardware operating the cryptographic module 308, evaluation information of cryptographic method and the like input from the host system unit 151. In selecting a cryptographic module 308, the selection is made from the cryptographic modules 308 conforming to the hardware profile 160 describing the hardware information of the cryptographic client device 150, and also according to the cryptographic module selecting policy 158 describing the policy of the user utilizing the cryptographic client device 150.

The hardware profile 160 is the information such as the CPU architecture, CPU clock, size of installed memory and the like of the cryptographic client device 150. The cryptographic module selecting policy 158 is the information such as the condition desired to be used by priority by the user, the manufacturer of the cryptographic module desired to be used by priority by the user, the cryptographic method desired to be prohibited by the user and the like, when there are a plurality of ciphers selected under the input conditions.

Thus, the cryptographic module selecting unit 159 selects a cryptographic module 308 suitable for the input information by referring to the input information from the host system unit 151, the hardware profile 160, and the cryptographic module selecting policy 158. When the cryptographic module selecting unit 159 selects a unique cryptographic module 308, the selected cryptographic module 308 is taken out from the cryptographic module DB 164. When the cryptographic module selecting unit 159 fails to select a unique cryptographic module 308, an error is output.

The key information management unit 162 stores/reads out the data such as key information specified when calling the implemented cryptographic module unit 153 or information of a cryptographic method parameter in/from the key information DB 165. When there is more than one item of specified key information or cryptographic method parameter, the key information management unit 162 relates a plurality of items of information so as to be extracted as one unit to register in the key information DB 165. Further, when extracting the key information or cryptographic method parameter from the key information DB 165, the key information management unit 162 controls the access to the key information from a plurality of host system units 151 according to the cryptographic module selecting policy 158.

The cryptographic management unit 166 communicates with the cryptographic management server device 350 by way of the communication function 155, and receives the cryptographic package 307, etc. according to the procedure of cryptographic module initial registration, distribution and updating. When the cryptographic management unit 166 receives the cryptographic package 307, etc. from the cryptographic management server device 350, it performs processing according to the contents of the cryptographic control manager policy 167. The contents of the cryptographic control manager policy 167 include, for example, five items as follows. The first item is whether or not to execute server authentication in communication with the cryptographic management server device 350. The second item is whether or not to encrypt when receiving a cryptographic package 307 or the like from the cryptographic management server device 350. The third item is whether or not to add a tampering detector (MAC: Message Authentication Code) when receiving a cryptographic package 307 or the like from the cryptographic management server device 350. The fourth item is whether or not to execute verification of the authenticator of the received cryptographic package 307 or the like. The fifth item is specified information about periodic updating showing whether or not to periodically update the cryptographic package 307 stored in the cryptographic module evaluation DB 163 and cryptographic module DB 164 and the frequency of updating.

The cryptographic hardware management control unit 170 communicates with the cryptographic hardware unit 450, and receives the cryptographic package 307 according to the procedure of cryptographic module initial registration from the cryptographic management server device 350. When receiving the cryptographic package 307, if the cryptographic package 307 itself is encrypted, the cryptographic package 307 is decoded by the cryptographic hardware unit 450. When it is detected that the message authentication code is added to the cryptographic module 308, the cryptographic hardware unit 450 detects tampering of the cryptographic module 308.

The algorithm negotiation unit 168 cooperates with the communication function 155 and negotiates the cryptographic method to be used in establishing a communication session and the cryptographic method to be used in the communication session, prior to the establishment of a secure communication session between two cryptographic client devices.

The secure communication management unit 169 cooperates with the communication function 155 and establishes a secure communication session with another cryptographic client device 150. When establishing a secure session, the secure communication management unit 169 performs session key sharing after the cryptographic method to be used in establishing the communication session and the cryptographic method to be used in the communication session are determined by the algorithm negotiation unit 168. After establishing the secure communication session, the secure communication management unit 169 allows an authenticator to be added for encrypting the communication data and preventing illegal alteration of communication data by using the session key according to the determined cryptographic method. The secure communication management unit 169 allows the communication session, once established, to be held so as to be utilized again within a specified time.

FIG. 3 is a detailed configuration diagram of the cryptographic management server device 350. The cryptographic management server device 350 includes a cryptographic module DB 353, a cryptographic module evaluation DB 354, a cryptographic management unit 351 which reads and updates the information stored in the cryptographic module DB 353 and the cryptographic module evaluation DB 354, a cryptographic module registration unit 355 which registers information in the cryptographic module DB 353 and the cryptographic module evaluation DB 354, and a cryptographic module distribution unit 352 which transmits the cryptographic module to the cryptographic client device 150.

The cryptographic module DB 353 is a database storing the cryptographic module 308 stored in advance or entered by the user.

The cryptographic module evaluation DB 354 is a database storing the cryptographic evaluation description file 309 stored in advance or entered by the user.

The cryptographic management unit 351 has an interface with the user of the cryptographic management server device 350, for searching a cryptographic module 308 and a cryptographic package 307 stored in the cryptographic module DB 353 and the cryptographic module evaluation DB 354, displaying the contents of a cryptographic module evaluation unit, displaying a list of managed ciphers, updating existing ciphers, deleting an existing cipher, registering a new cipher, and starting/stopping a cryptographic module distribution unit. The cryptographic management unit 351 requests the cryptographic module registration unit 355 for registration when registering a new cipher.

The cryptographic module registration unit 355 has a cryptographic package registration unit 357 and a compound type description generation unit 358.

The cryptographic module distribution unit 352 has a cryptographic package distribution control unit 359, a cryptographic package distribution composition unit 370 having a distribution policy 371, and a distributed cryptographic module selecting unit 360 having the distribution policy 371. The cryptographic module distribution unit 352 interprets a request from the cryptographic client device 150, and executes waiting services for executing three procedures of cryptographic module initial registration, distribution, and updating. In the waiting services, logs of processing are recorded.

In the distributed cryptographic module selecting unit 360, a cryptographic module 308 suited to distribution is selected based on three procedures of cryptographic module initial registration, distribution, and updating, and the request from the cryptographic client device 150. In the case of cryptographic module initial registration, the cryptographic module 308 to be distributed is a cryptographic method described in the distribution policy 371, as defined to be indispensable for use.

In the cryptographic package distribution composition unit 370, based on the cryptographic module 308 selected by the distributed cryptographic module selecting unit 360, the cryptographic module 308 and the cryptographic evaluation description file 309 corresponding to the cryptographic module 308 are composed according to the distribution policy 371 so as to be distributed as a cryptographic package 307. The distribution policy 371 describes, for example, the following four items.

The first item is whether or not to encrypt a cryptographic package 307 when distributing the cryptographic package 307. The second item is a cryptographic method for encrypting a cryptographic package 307. The third item is whether or not to add a tampering detector when distributing the cryptographic package 307. The fourth item is the cryptographic method of the tampering detector of the cryptographic package 307.

In the composition process by the cryptographic package distribution composition unit 370, the content stored in the cryptographic module evaluation DB 354 is generated in a specified format as a cryptographic evaluation description file 309, and an authenticator is added to the cryptographic package 307 in order to approve distribution by the cryptographic management server device 350, and the cryptographic module 308 and the cryptographic evaluation description file 309 are combined as a pair into a cryptographic package 307.

The cryptographic package distribution composition unit 370 may also combine a plurality of cryptographic modules 308 and the cryptographic evaluation description files 309 corresponding to the plurality of cryptographic modules 308 as one cryptographic package. In the composition process performed by the cryptographic package distribution composition unit 370, the cryptographic package 307 is encrypted, a tampering detector is added, and key generation and key management therefore are performed according to the cryptographic control manager policy of the cryptographic client device 150 or the distribution policy 371 of the cryptographic management server device 350.

Second Embodiment

While in the first embodiment the optimum cryptographic method is selected by the cryptographic client device, in the second embodiment, the optimum cryptographic method is selected by the initiative of the cryptographic management server device. That is, in a cryptographic module distribution system shown in FIG. 4, a server reinforced cooperation mechanism is adopted in which the selection result information of a cryptographic method selected by a cryptographic management server device 1350 is managed and utilized in a module selection policy storage unit 110. In particular, when the calculation capacity of the module selection policy storage unit 110 is poor, the cryptographic management server device 1350 supports the operation, and the response performance in a cryptographic client device 1100 can be enhanced.

More specifically, selection of cryptographic module 308 most suited to a request from a host system unit 1151 is executed by the cryptographic management server device 1350, and the result thereof is received in a cryptographic control manager unit 1152 of a cryptographic client device 1100, and the relation between the required condition and the optimum cryptographic module 308 is managed in a cryptographic information storage unit 1600. The cryptographic control manager unit 1152 processes according to a cryptographic control manager request from the host system unit 1151, based on the relation between the request from the host system unit 1151 and the cryptographic module 308 most suited to the request. Therefore, unlike the first embodiment, the cryptographic client device 1100 does not always require the management of cryptographic packages 307 and the reception of cryptographic packages 307 from the cryptographic management server device 1350 for all selection functions of a cryptographic module 308 or selection of a cryptographic module 308.

Figure 4:
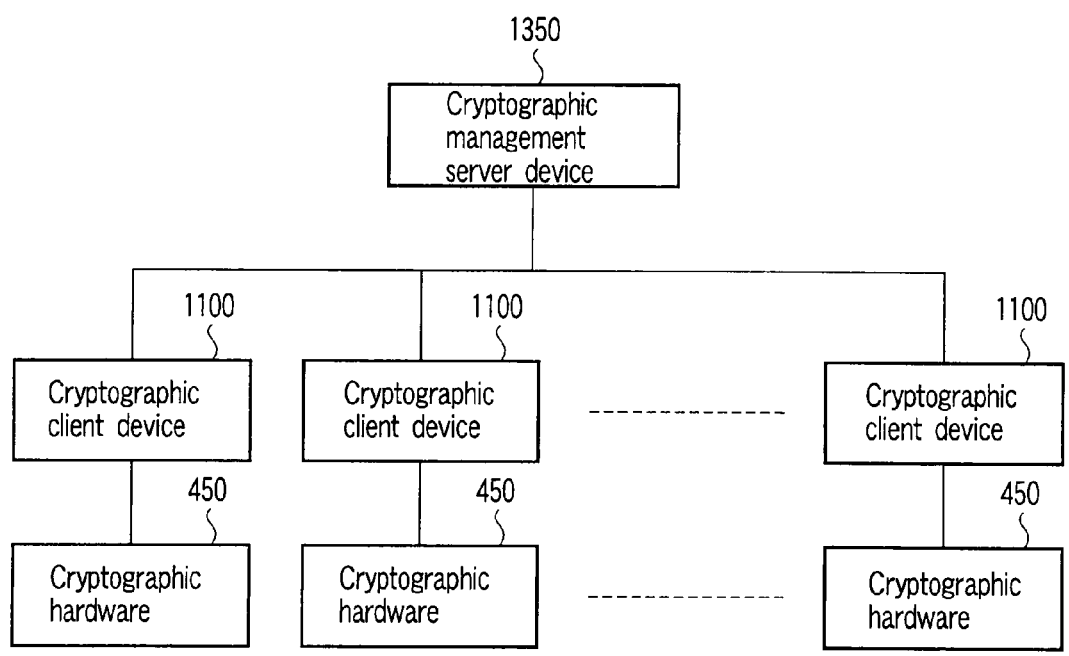
FIG. 4 is a block diagram showing a configuration of a cryptographic module distribution system in a second embodiment of the invention.

FIG. 4 is a block diagram of an outline configuration of a cryptographic module distribution system in the second embodiment of the invention. This system includes one or more cryptographic client devices 1100, one or more cryptographic hardware units 1450, and a cryptographic management server device 1350. The cryptographic hardware unit 1450 is the same as in the first embodiment. Herein, a plurality of cryptographic hardware units 1450 may be connected to each cryptographic client device 1100. The cryptographic hardware unit 1450 may also be installed in the cryptographic client device 1100.

Figure 5:
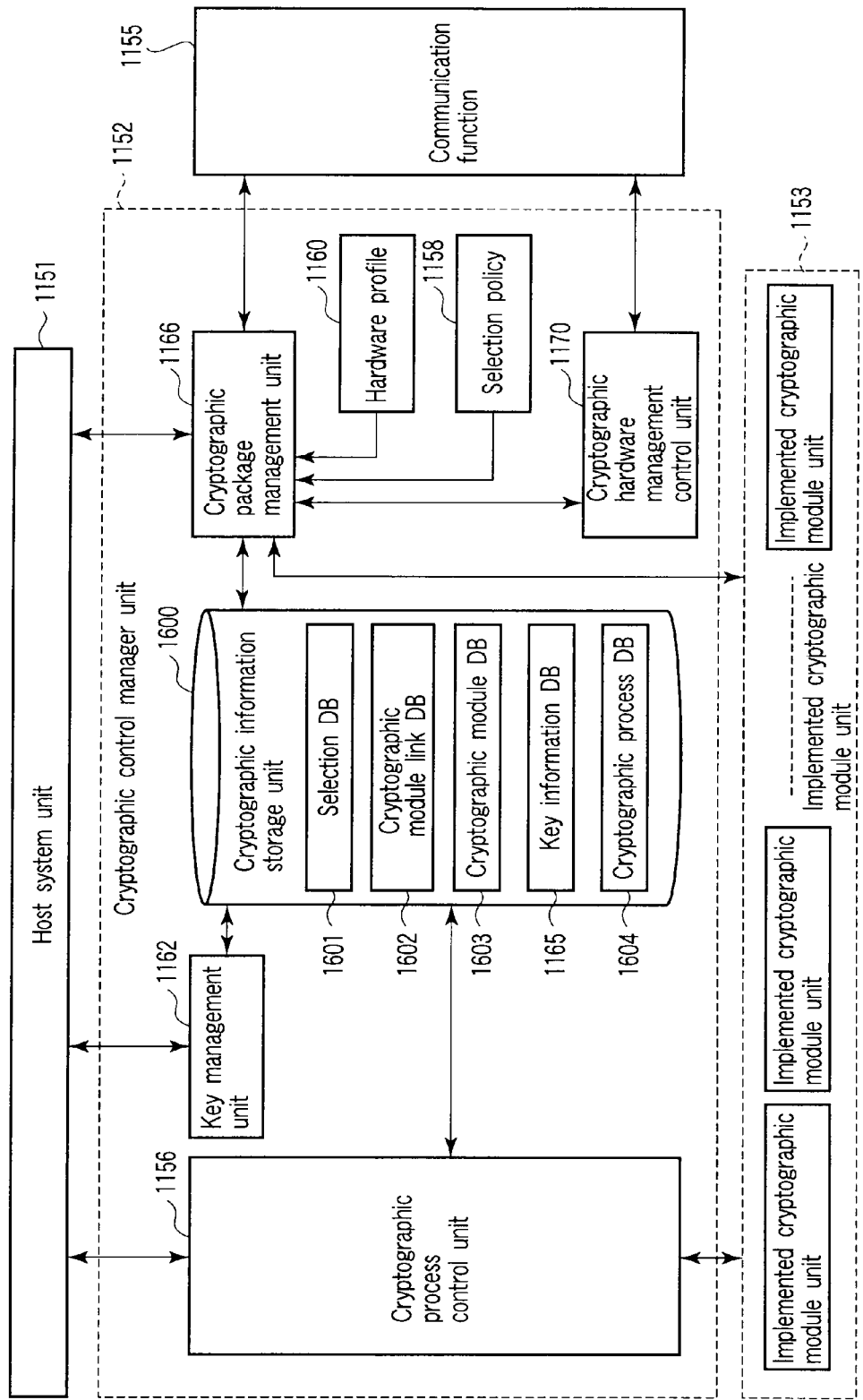
FIG. 5 is a block diagram showing a configuration of a cryptographic client device in the same embodiment.

FIG. 5 is a block diagram showing a configuration of the cryptographic client device 1100. The cryptographic client device 1100 includes a host system unit 1151, a cryptographic control manager unit 1152, an implemented cryptographic module unit 1153, and a communication function 1155. A selection policy 1158 is file setting priority information concerning security, processing speed, and resources. The host system unit 1151 and the implemented cryptographic module unit 1153 have the same configuration and function as in the first embodiment.

The cryptographic control manager unit 1152 has a cryptographic process control unit 1156, a key management unit 1162, a cryptographic information storage unit 1600, a cryptographic package management unit 1166, and a cryptographic hardware management control unit 1170.

The cryptographic process control unit 1156 has a function of receiving a cryptographic control manager request including a cryptographic process condition from the host system unit 1151, a function of referring to the cryptographic information storage unit 1600 and specifying the cryptographic module 1153 relating to the cryptographic process condition, a function of requesting the cryptographic process to the implemented cryptographic module unit 1153 according to a cryptographic process execution timing, a function of issuing a cryptographic process ID for the cryptographic process and storing the cryptographic process ID in relation to the information about the encrypting process in the cryptographic information storage unit 1600, and a function of outputting the cryptographic process result from the implemented cryptographic module unit 1153 and the cryptographic process ID relating to the cryptographic process to the host system unit 1151.

The key management unit 1162 has a function of registering, deleting, acquiring, searching, or updating a key information in a key information DB 1165 of the cryptographic information storage unit 1600 according to the request from the host system unit 1151, a function of issuing a key ID when the registration of a cryptographic key is executed normally, and storing the key ID in relation to the information about the registration process in the cryptographic information storage unit 1600, and a function of sending out the respective processing results to the host system unit 1151 including the cryptographic process ID or the key ID depending on the circumstances.

The cryptographic information storage unit 1600 has functions of storing a selection DB 1601, a cryptographic module link DB 1602, a cryptographic module DB 1603, the key information DB 1165, and a cryptographic process DB 1604. The cryptographic information storage unit 1600 may also have functions of controlling and managing each DB of the cryptographic information storage unit 1600 according to requests from the key management unit 1162, the cryptographic process control unit 1156 and a cryptographic package management unit 1166.

Figure 11:
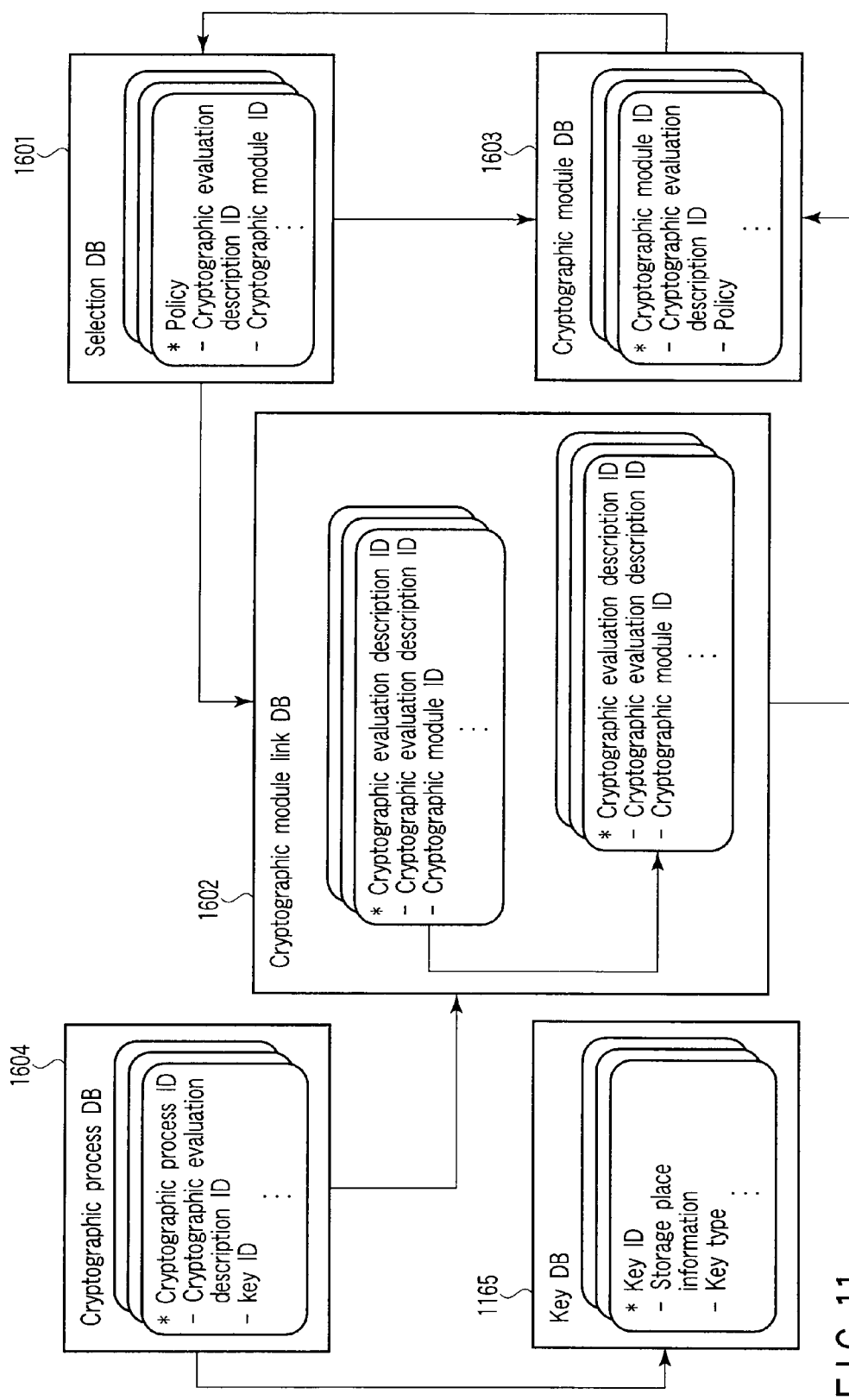
FIG. 11 is a diagram showing a logic composition of databases in the same embodiment.

The data structure of the selection DB 1601 is as shown in FIG. 6. The data structure of the cryptographic module link DB 1602 is as shown in FIG. 7. The data structure of the cryptographic module DB 1603 is as shown in FIG. 8. The data structure of the key information DB 1165 is as shown in FIG. 9. The data structure of the cryptographic process DB 1604 is as shown in FIG. 10. FIG. 11 shows the logical relation of each database of the cryptographic information storage unit 1600.

The cryptographic package management unit 1166 has the following functions.

First of all, the cryptographic package management unit 1166 has functions of registering, in the cryptographic storage unit 1600, the algorithm ID, cryptographic module evaluation description ID, cryptographic module ID, and recommended key length information of selected cryptographic package 307, which are obtained by transmitting the information including the selection condition, selection policy and hardware profile input from the host system unit 1151 to the cryptographic management server device 1350 by way of the communication function 1155.

Further, the cryptographic package management unit 1166 has functions of executing a cryptographic package initial registration protocol by using a final initial registration date and a final initial registration domain as input to the cryptographic management server device 1350 by way of the communication function 1155 according to a request input from the host system unit 1151, and downloading the minimum required cryptographic packages 307 from the cryptographic management server device 1350, and registering the cryptographic packages 307 in the cryptographic information storage unit 1600.

Moreover, the cryptographic package management unit 1166 has functions of transmitting the information including selecting condition, selecting policy, hardware profile, and list of cryptographic packages 307 held in the terminal entered from the host system unit 1151 to the cryptographic management server device 1350 by way of the communication function 1155, acquiring the entity and accessory information (algorithm ID, cryptographic module evaluation description ID, cryptographic module ID) of the cryptographic packages 307 selected by the cryptographic management server device 1350, and registering the selected cryptographic packages 307 in the cryptographic information storage unit 1600.

The cryptographic hardware management control unit 1170 has functions of executing communication control to the cryptographic hardware via the communication function 1155 in response to requests from various parts of the cryptographic control manager unit 1152.

The communication function 1155 has functions of mutually communicating between the cryptographic package management unit 1166 or the cryptographic hardware management control unit 1170 and the partner communication device or the cryptographic hardware.

FIG. 12 is a functional block diagram showing a configuration of the cryptographic management server device 1350. The cryptographic management server device 1350 includes a server host system unit 1380, a communication function 1356, a cryptographic management server control unit 1352, a cryptographic package storage unit 1355, and a server cryptographic control manager unit 1390.

The server host system unit 1380 has the same functions as the host system unit 1151 of the cryptographic client device 1100, and also has functions of transmitting a control request from the system manager about the cryptographic management to the cryptographic management server control unit 1352.

The communication function 1356 has functions for mutual communications between the cryptographic management server control unit 1352 or the server cryptographic control manager unit 1390 and the partner communication device, and the cryptographic hardware or a simulator simulating the operation of the cryptographic hardware.

The cryptographic management server control unit 1352 includes a cryptographic package management control unit 1359, a cryptographic package management unit 1351, a cryptographic package distribution composition unit 1370, and a distributed cryptographic package selecting unit 1373.

The cryptographic package management control unit 1359 has a function of registering a cryptographic package 307 by a request from the server host system unit 1380, a function of updating an already registered cryptographic package by a request from the server host system unit 1380, a function of verifying the vendor approval authenticator for checking the source of the cryptographic package when presenting the cryptographic package from the vendor, a function of generating a compound type cryptographic module evaluation description unit by combining a plurality of single type cryptographic module evaluation description parts or a plurality of compound type cryptographic module evaluation description parts, a function of searching and acquiring a list of cryptographic packages 307 registered in the cryptographic module DB 1353, a function of deleting a cryptographic module 308 and the related cryptographic package 307 from the cryptographic module DB 1353 according to a request from the server host system unit 1380, and a function of outputting logs corresponding to the registration, updating, and deleting process executed on the cryptographic package storage unit 1355.

The cryptographic package management unit 1351 has a function of processing in parallel management control requests from a plurality of cryptographic client devices 1100, a function of executing an initial registration process, distribution process, updating process, selection process, updating notice process, and cryptographic management domain transfer process of a cryptographic package 307, a function for establishing a security protected communication path between the cryptographic client device 1100 and the cryptographic management server device 1350, a function of managing a status of a cryptographic client management device existing in the domain managed by the cryptographic management server device 1350, and a function of generating logs with respect to the initial registration process, distribution process, updating process, selecting process, updating notice process, and cryptographic management domain transfer process of a cryptographic package 307.

The cryptographic package distribution composition unit 1370 has a function of acquiring a cryptographic package 307 selected in the distributed cryptographic package selecting unit 1373 from the cryptographic module DB 1353, a function of composing and outputting data of each description item stored in the cryptographic module DB 1353 in a cryptographic module evaluation description format such as XML, a function of generating a key by requesting a process to the server cryptographic control manager unit 1390 according to a specified security system relating to the key to be used in a security communication of the cryptographic package management control unit 1359, a function of managing information about a key based on information including an ID of the cryptographic client device 1100 and a security system of the key, and a function of performing security processes of data protection and data authentication on information to be transmitted to the cryptographic client device 1100 from the cryptographic management server 1350 according to the security level and security system defined in the distribution policy of the cryptographic management server device 1350.

The distributed cryptographic package selecting unit 1373 has a function of determining the initial registration in the cryptographic package initial registration process, and selecting a cryptographic method and selecting a cryptographic package, a function of determining the distribution and selecting a cryptographic package in a cryptographic package distribution process, a function of determining the distribution in a cryptographic package updating process, a function of acquiring the updated cryptographic module list and selecting a cryptographic package in a cryptographic package updating process, a function of determining the selection and selecting a cryptographic package in a cryptographic package selecting process, a function of determining the move and generating the domain move process information in a cryptographic management domain transfer process, and a function of searching the cryptographic package storage unit for a cryptographic package satisfying the selecting condition, selecting policy and hardware policy.

The cryptographic package storage unit 1355 includes the cryptographic module DB 1353 for recording and managing registered cryptographic modules 308, and a cryptographic module evaluation DB 1354 for recording and managing the cryptographic evaluation description files 309.

The server cryptographic control manager unit 1390 has the same functions as the cryptographic control manager 1152 of the cryptographic client device 1100, and also has functions of cooperating with the cryptographic management server device 1352 for cryptographic resource management control in the cryptographic management server device 1350 and for cipher authentication communication with other communication devices.

Third Embodiment

Next, a case where a terminal device having a plurality of cryptographic modules in advance selects a cryptographic module conforming to the own device is described.

FIG. 13 is a schematic block diagram of a terminal device 100 in the third embodiment. The terminal device 100 of the third embodiment is a device including the whole or a part of the functions of the cryptographic client device shown in FIG. 2, and in the third embodiment and fourth embodiment, the function of selecting a cryptographic module is contained in this terminal device 100. In the terminal device 100 in FIG. 13, a cryptographic module suited to the terminal device 100 is selected, for example, by the terminal device 100 itself. In this terminal device 100, cryptographic module evaluation information is compiled by describing functions and properties of a cryptographic module, and the cryptographic module evaluation information is related to the cryptographic module. A circumstance is input from outside as a specified condition, and by using this data, an appropriate cryptographic module is determined and output. Herein, "outside" means a function part directly related to the cryptographic module itself such as the implemented cryptographic module unit 153 or the cryptographic module DB 164 shown in FIG. 2, but not necessary when selecting the cryptographic module, and an example thereof is the host system unit 151 shown in FIG. 2.

The condition includes, in addition to the condition input every time, a hardware profile, a cryptographic module selecting policy, and other conditions. The terminal device 100 at least includes the cryptographic module selecting unit 159, the cryptographic module selection policy 158, the hardware profile 160, and the cryptographic module evaluation DB 163 shown in FIG. 2. More specifically, the cryptographic module selecting unit 159 includes a condition input unit 201, a cryptographic module extracting unit 202, a cryptographic module reducing unit 203, and a selection result output unit 204 shown in FIG. 13.

In FIG. 13, the condition input unit 201 acquires condition information for specifying the condition of the cryptographic module to be selected. In this acquisition, the condition information specified by the host system unit is acquired. Alternatively, information entered from an external device may be received and acquired, or information input from a keyboard or other input device may be acquired.

Herein, the condition information includes, for example, a specified condition, and the specified condition includes category information for specifying the category of the cryptographic module, processing speed of the cryptographic module, and memory capacity necessary for execution of the cryptographic module.

The condition input unit 201 can also acquire information to be an operating condition of a device for executing the cryptographic module stored in the device as the condition information.

The hardware profile 160 stores information about the function and performance of the hardware of the terminal device 100 utilizing a cryptographic module, and such information includes, for example, the upper limit of the memory use in the hardware, the processing speed of CPU, and the processing speed of the cryptographic module. This hardware profile has only to be stored in the device, and may be, for example, provided and stored in a region of a predetermined memory region reserved for storing the hardware profile, or may be distributed and stored for each piece of hardware with respect to the function and the performance of the hardware.

The cryptographic module evaluation DB 163 stores identification information of a cryptographic module and cryptographic module evaluation information describing either one or both of the function and the performance of the cryptographic module in relation to the cryptographic module.

An example of the cryptographic module evaluation information stored in the cryptographic module evaluation DB 163 is shown in FIG. 14. As shown in FIG. 14, in the cryptographic module evaluation information, a description item and an outline thereof are related to each other and stored, and one piece of cryptographic module evaluation information and the corresponding piece of cryptographic module evaluation information are related to each other and stored.

The cryptographic module extracting unit 202 has a function of compiling a list by extracting cryptographic modules suited to the specified conditions input from the condition input unit 201. The input of specified conditions includes not only the input of conditions on every occasion of selection, but also the conditions stored in the terminal (for example, in the hardware profile 160, herein) as restricting conditions arising from the hardware of the terminal or combination of both. Accordingly, the cryptographic module dependence relation and restricting conditions are described in the cryptographic module evaluation information, and used when compiling a list.

The cryptographic module extracting unit 202 also extracts cryptographic module evaluation information conforming to the conditions of the cryptographic module to be selected contained in the condition information acquired by the condition input unit 201, from the cryptographic module evaluation information of the cryptographic modules stored in the evaluation information storage unit 163.

Further, the cryptographic module extracting unit 202, when extracting the cryptographic module evaluation information, determines whether the cryptographic module evaluation information satisfies the condition information or not, and extracts the cryptographic module evaluation information satisfying the condition.

The cryptographic module selection policy 158 stores information including the condition given priority by the user when a plurality of cryptographic modules are selected by the input condition, the developing manufacturer of the cryptographic module given priority by the user, and the cryptographic method and cryptographic module desired to be prohibited by the user.

The cryptographic module reducing unit 203 has a function of selecting a cryptographic module most suited to the specified condition in the case where the specified condition is to select the most suited one by reducing according to the degree of priority. That is, the cryptographic module reducing unit 203 compares respective items of cryptographic module evaluation information in the set of cryptographic module evaluation information, and determines the information most suited to the condition information input by the condition input unit 201, and thereby reduces the cryptographic module to the one most suited to the condition. The input of specified conditions includes not only the input of conditions on every occasion of selection, but also the usual conditions for the terminal stored in the terminal (for example, the cryptographic module selection policy 158 is stored) or a combination of both. The target of selection may be selected from all cryptographic modules in the terminal device 100 or from cryptographic modules (group) output from the cryptographic module extraction unit 202. For this purpose, the score evaluation of cryptographic modules is described in the cryptographic module evaluation information, and is referred to when making selection.

The selection result output unit 204 reads out the identification information of the cryptographic module corresponding to the cryptographic module evaluation information selected by the cryptographic module extracting unit 202 or cryptographic module reducing unit 203 from the cryptographic module evaluation information storage unit 163 and outputs the read identification information.

The selection result output unit 204 may execute either one of the following two processes in the case where the cryptographic module evaluation information matching with the condition of cryptographic module is not found when extracting the cryptographic module evaluation information conforming to the condition of the cryptographic module by the cryptographic module extracting unit 202 or cryptographic module reducing unit 203:
(1) To terminate the process by outputting absence of a corresponding cryptographic module;
(2) To have a function of outputting an instruction for search by outputting the condition of the cryptographic module to an external device, and receiving, from the external device, the identification information of the cryptographic module searched according to the search request.

In the third embodiment, the process (1) is executed, and the process (2) will be explained in a fifth embodiment.

Figure 15:
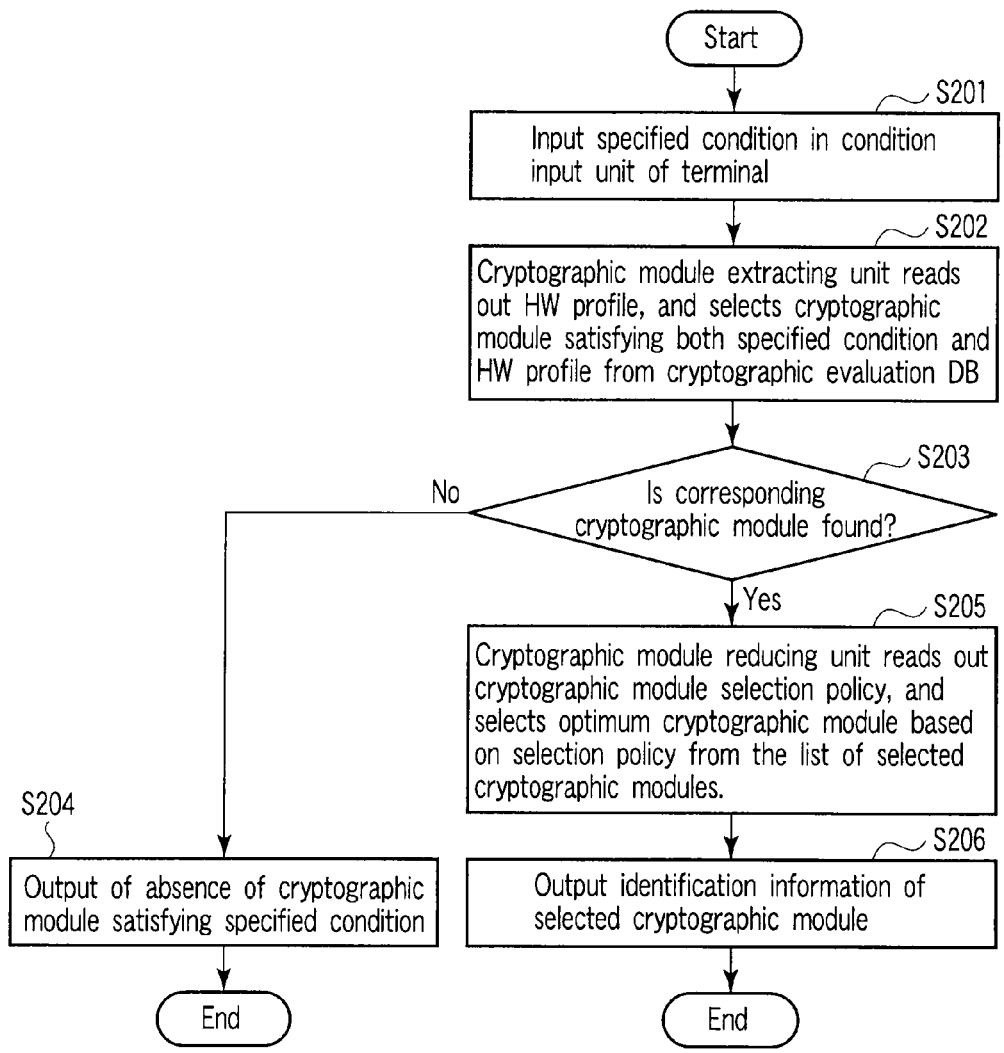
FIG. 15 is a flowchart of operation of the cryptographic selecting device in the same embodiment.

The operation of the terminal device 100 in FIG. 13 is explained by referring to FIG. 15.

In determining a cryptographic module to be used in a certain terminal device, when the condition of the cryptographic module desired to be used is input from the condition input unit 201 as the specified condition (step S201), and the cryptographic module extracting unit 202 of the terminal device 100 reads out the hardware profile of the terminal device stored in the hardware profile 160, searches the cryptographic module evaluation information DB 163 by using the combination of the specified condition and the hardware profile as the specified condition, and selects the optimum cryptographic module satisfying the specified condition (step S202).

FIG. 16 shows an example of input and output data in this embodiment. As shown in FIG. 16, when the specified condition is entered from a host application, the cryptographic module evaluation DB 163 is referred to, and the optimum cryptographic module satisfying the specified condition is extracted. Further, examples of the specified condition include (1) "public key cryptosystem" as a category, (2) "70 points or more" of evaluation score as a speed, (3) "20 MB" as the upper limit of memory use, and (4) "highest security among those satisfying the conditions (1) to (3)" as other condition. As an example of a hardware profile of the terminal, the information (5) "10 MB" as the upper limit of memory use in this hardware is read out.

At this time, the cryptographic module extracting unit 202 selects the cryptographic module in the following procedures:

Procedure (A)

The conditions (1), (2) and (3) are acquired by the cryptographic module extracting unit 202 by way of the condition input unit 201. The cryptographic module extracting unit 202 refers to the cryptographic module evaluation DB 163 and the hardware profile 160 (hardware profile (5) above), and compiles a list of cryptographic modules satisfying the conditions among them, and outputs the list.

More specifically, first, the condition (3) and the condition (5) of the hardware are compared. Since the condition (5) is a stronger condition (a stricter condition) than the condition (3), a correction is made by replacing the condition (3) with the condition (5). In the case where the specified condition (3) is not present, the condition (5) is still added to the conditions (1) and (2), and the specified conditions are determined. The cryptographic module extracting unit 202 searches the cryptographic module evaluation DB 163 for the cryptographic modules satisfying the conditions (1), (2) and (5), and compiles and outputs a list of cryptographic modules satisfying the conditions. Here, it is determined whether there is any cryptographic module satisfying the conditions (step S203). If there is no cryptographic module satisfying the specified conditions, the determination result is output (step S204), and if there is a conforming cryptographic module, the process goes to the following procedure (B).

Procedure (B)

When the output of procedure (A) and the condition (4) are input in the cryptographic module reducing unit 203 from the cryptographic module extracting unit 202, the cryptographic module reducing unit 203 refers to the cryptographic module evaluation DB 163 and the cryptographic module selection policy 203, and selects the cryptographic module most suited to the condition (4) (in this case, the highest in security) from the output list of procedure (A) (step S205), and outputs the identification information of this cryptographic module (step S206). The identification information of the cryptographic module selected and output in this procedure (B) is the information showing the desired cryptographic module.

In procedure (B), a plurality of conditions may be specified. For example, the cryptographic module of highest speed and smallest memory usage may be desired. In this case, for example, the condition that "the speed is given priority over the memory usage" may be determined so that the highest speed is selected first and, if a plurality of cryptographic modules are selected, the smallest memory usage is selected among them. Thus, the choices can be reduced, but this is only one example, and the reducing method is not limited thereto.

In this embodiment, the configuration combining the condition input unit 201, the cryptographic module extracting unit 202, the cryptographic module reducing unit 203, and the selection result output unit 204 may be provided in the distributed cryptographic module selecting unit 360 in FIG. 3.

Fourth Embodiment

Next, a fourth embodiment is explained. While in the third embodiment, the terminal device 100 itself extracts the cryptographic module to be used in the terminal device 100, in the fourth embodiment, common in configuration to the third embodiment, the optimum cryptographic module for executing encrypted communication between a plurality of terminal devices is extracted. This is a specific procedure of negotiating a cryptographic method to be executed by the algorithm negotiation unit 168.

FIG. 17 is a functional block diagram showing a configuration of the terminal in the fourth embodiment.

The internal configurations of cryptographic module selecting units of terminals A, B of FIG. 17 are the same as in FIG. 13.

As shown in FIG. 17, in a system for encrypted communications between terminals A and B, the hardware profile of both communicating terminals is used as input information to the cryptographic module selecting unit 159 to determine the cryptographic method to be commonly used in addition to the cryptographic module evaluation information, and the optimum cryptographic module for the terminal devices A, B with respect to this algorithm is selected.

Figure 18:
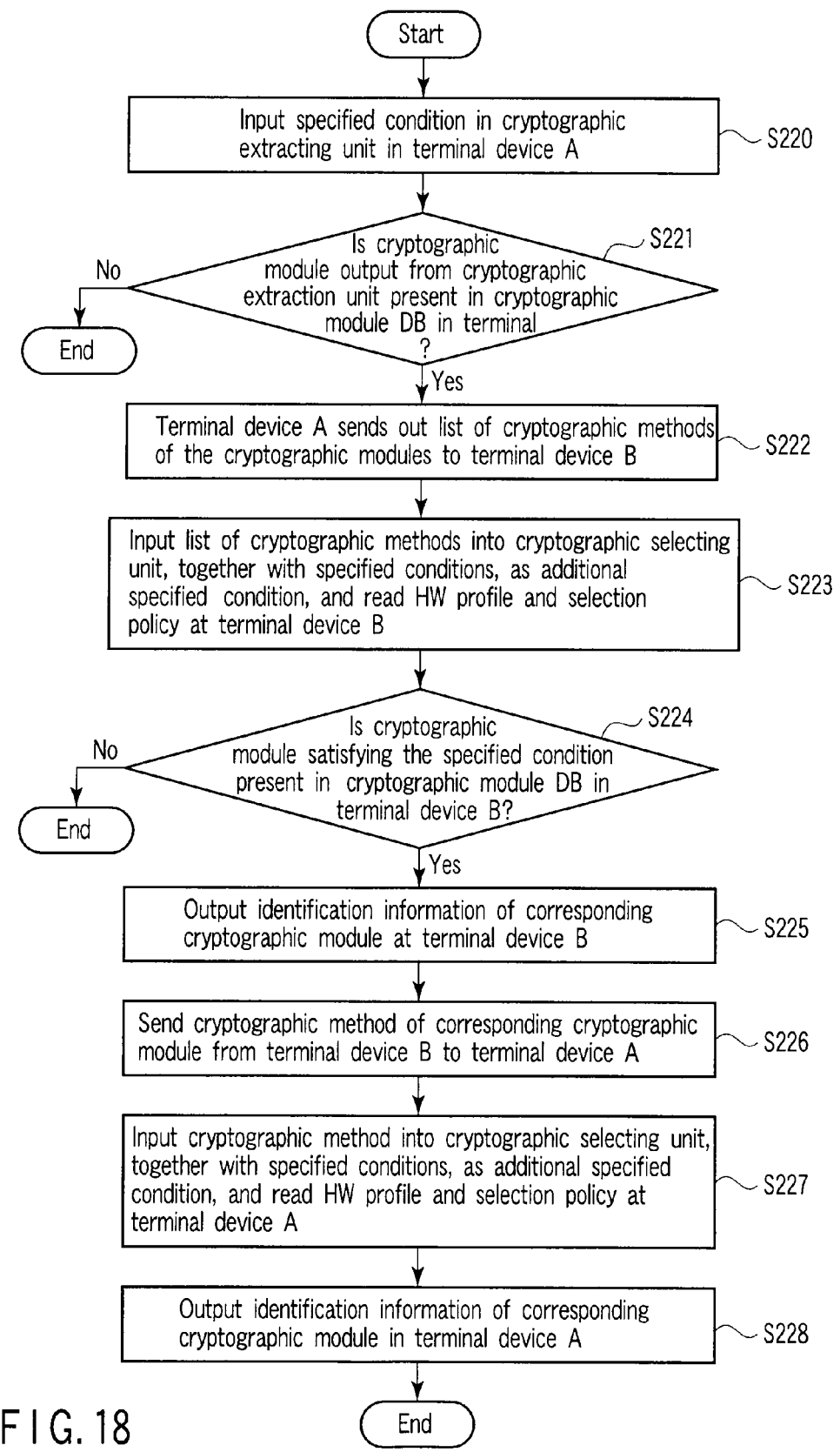
FIG. 18 is a flowchart of operation of the cryptographic selecting device in the same embodiment.

The operation of the terminal devices A and B in FIG. 17 is explained by referring to FIG. 18.

The terminal device A inputs the specified condition to the cryptographic module extracting unit 202 in the cryptographic module selecting unit 159 (step S220), and the cryptographic module is selected in the same manner as in the third embodiment. However, up to the cryptographic module extracting unit 202 in the cryptographic module selecting unit 159 is used. As a result, if cryptographic modules satisfying the specified condition are present in the cryptographic module DB in the terminal device (step S221), a list of cryptographic methods (cryptographic algorithms) of the cryptographic modules is transmitted from the terminal device A to the terminal device B (step S222).

In the terminal device B, in addition to the ordinary specified condition, the cryptographic method received from the terminal device A is used as the additional condition, and the cryptographic module is selected in the same manner as in the third embodiment (step S223). As a result, when there is a cryptographic module satisfying the specified condition in the cryptographic module DB in the terminal device B (step S224), the identification information of the cryptographic module is obtained (step S225), and the cryptographic module is used in the terminal device B, and the cryptographic method thereof (since the selection is performed through the cryptographic module reducing unit 203, there is only one cryptographic module, and thus only one cryptographic method) is sent back from the terminal device B to the terminal device A (step S226). In the terminal device A, the cryptographic method received from the terminal device B is used as additional condition, and the cryptographic module is selected in the same manner as in the third embodiment (step S227). As a result, the identification information of the resulting cryptographic module is obtained (step S228), and this cryptographic module is used in the terminal device A.

Here, an example of input and output data in this embodiment is explained in FIG. 19. As shown in FIG. 19, when the specified condition from the host application, and the hardware profile of the both terminal devices for communicating between the terminal devices are input as the conditions, the optimum cryptographic module suited to the environments of the both terminal devices communicating therebetween is selected by referring to the respective cryptographic module evaluation DBs 163 in the terminal devices.

The following should be noted as supplementary explanation of the embodiment:

(1) The specified condition at the terminal A can be the cryptographic method itself.

(2) The selected cryptographic module may not be present in the terminal A or in the terminal B. In this case, a necessary cryptographic module is received from the server by a method shown in a fifth embodiment explained below. If a necessary cryptographic module is not present in the server, it is dealt with as a selection error.

Fifth Embodiment

A fifth embodiment is explained below. While in the third embodiment, the terminal device 100 extracts the cryptographic module to be used in the own terminal device 100, in the fifth embodiment, the terminal device 100 selects the cryptographic module satisfying the specified conditions in the terminal device, and when the cryptographic module satisfying the specified conditions is not found in the terminal device 100, a server receiving a selection request (commission) from the terminal device 100 selects the optimum cryptographic module, and distributes the cryptographic module to the terminal device 100.

Herein, the "server" is a device storing many cryptographic modules, being capable of selecting a cryptographic module for the terminal device 100, and distributing the cryptographic module as required.

The "terminal device" is any device having the same function as in the third embodiment or fourth embodiment.

Figure 20:
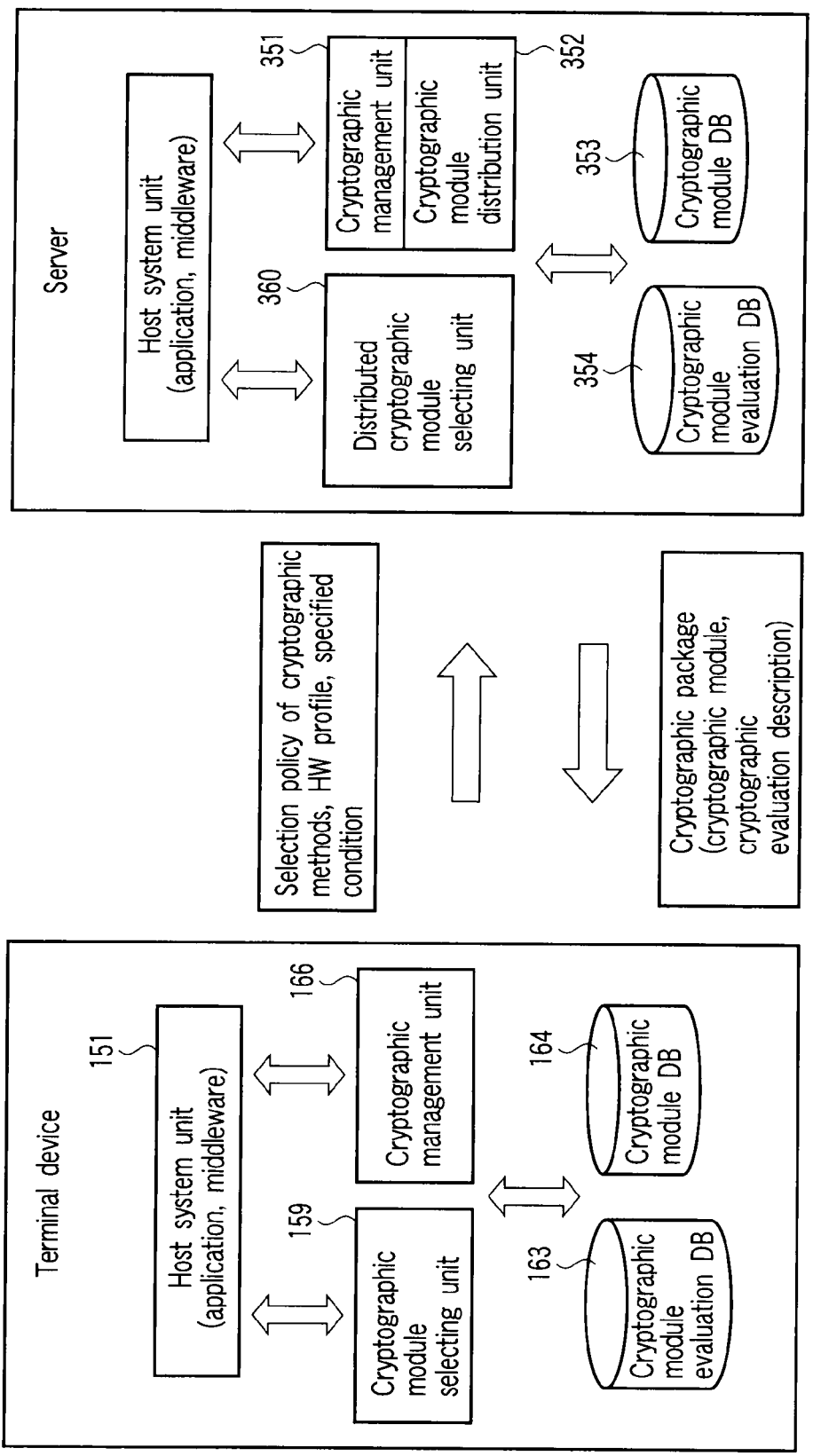
FIG. 20 is a functional block diagram of a cryptographic selecting device in a fifth embodiment of the invention.

FIG. 20 is a functional block diagram showing a server configuration of the terminal in the fifth embodiment.

In a system for updating the cryptographic method between the server and the terminal device, the cryptographic module evaluation information, the terminal hardware profile, and the terminal cryptographic method are used as the input information to the "cryptographic module selecting unit 159", and the optimum cryptographic module is selected in the process of distributing the cryptographic module from the server to the terminal device at the server side.

Figure 21:
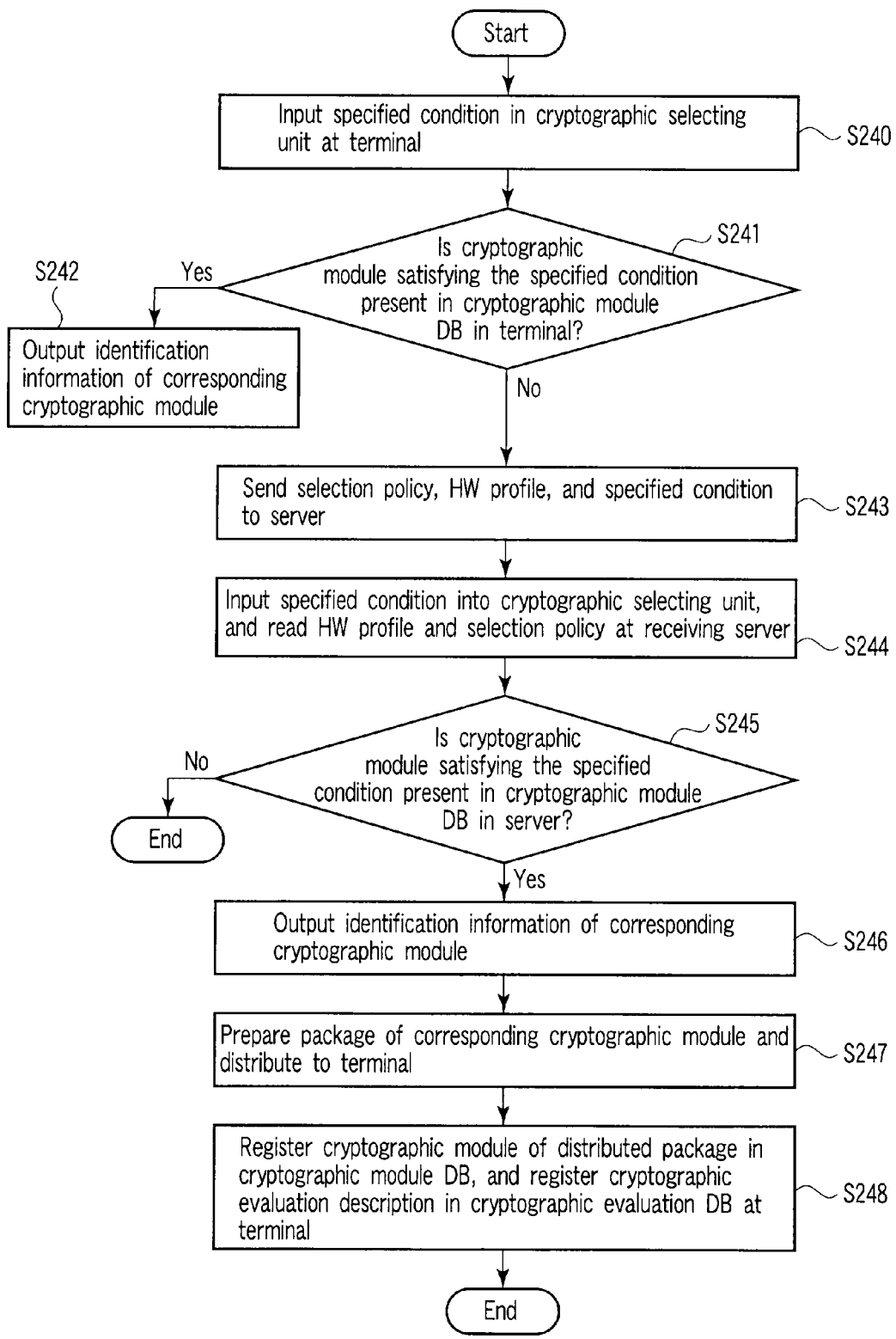
FIG. 21 is a diagram showing an overall operation of selection of a cryptographic module in the same embodiment.

The fifth embodiment is further described by referring to FIG. 21.

First, in the same manner as in the third embodiment, the terminal device 100 executes the cryptographic module selecting procedures (A) and (B). When the specified condition is entered (step S240), it is determined whether there is a cryptographic module conforming to this specified condition or not (step S241). When a conforming cryptographic module is obtained, the identification information of the cryptographic module is output (step S242). When there is no conforming cryptographic module, the server managing the cryptographic modules (an external device receiving commission of selection from the cryptographic method selecting device) is requested to distribute a cryptographic module satisfying the condition. This is the process of the selection result output unit, which is explained in detail below.

Figure 22:
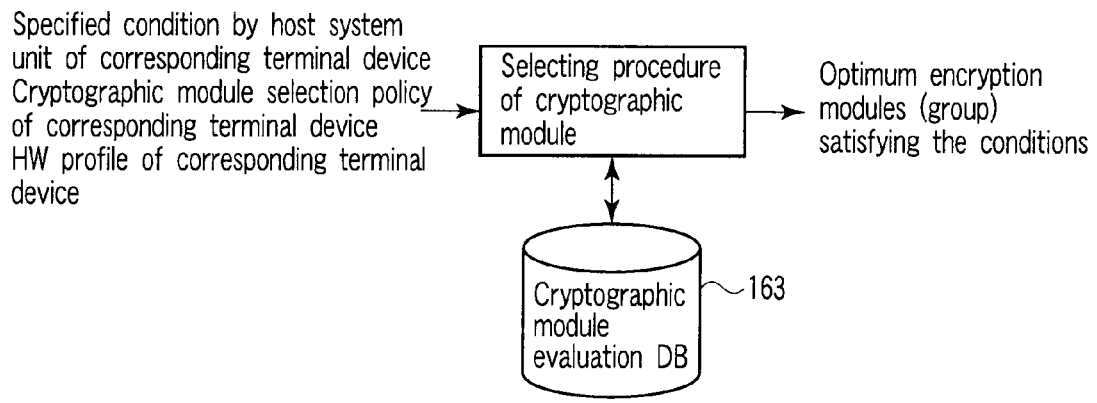
FIG. 22 is an example of data input and output to/from the cryptographic module selecting procedure when selecting a cryptographic module distributed from the server side in response to a request from the terminal side in the same embodiment.

In this case, the cryptographic module selecting unit in the terminal device executes the cryptographic module selecting procedures (A) and (B) receiving the specified condition as input. An example of data input and output here is shown in FIG. 22. As shown in FIG. 22, when the specified condition, the cryptographic module selection policy of the terminal device, and the hardware profile of the terminal device are input from the host system unit, the cryptographic module evaluation DB 163 is referred to and the optimum cryptographic module satisfying these conditions is extracted. If it is detected that the cryptographic module conforming to the conditions is not extracted as a result of executing the procedures, the selection result output unit 204 in the terminal device shown in FIG. 20 transmits the specified condition, the selection policy, and the terminal hardware profile output from the cryptographic module reducing unit 203 as condition (5) to the distributed cryptographic module selecting unit 360 of an external server (step S243).

The distributed cryptographic module selecting unit 360 in the external server receives the condition (5) as input (step S244), and executes the cryptographic module selecting procedure. An example of data input and output here is shown in FIG. 22. As shown in FIG. 22, when the specified condition, the cryptographic module selection policy of the terminal device, and the hardware profile of the terminal device are input from the host system unit, the cryptographic module evaluation DB 354 in the server is referred to and the identification information of the optimum cryptographic module satisfying these conditions is extracted (step S245). The extracted identification information of the cryptographic module is output (step S246).

When the identification information of the optimum cryptographic module satisfying the conditions is extracted, the cryptographic module distribution unit 352 extracts the cryptographic module corresponding to this identification information from the cryptographic module DB 353 in the server, extracts the cryptographic module evaluation description of the cryptographic module corresponding to the identification information from the cryptographic module evaluation DB 354 in the server, combines the extracted cryptographic module and the extracted cryptographic module evaluation description to form a cryptographic package, and distributes the cryptographic package to the terminal device (step S247).

The terminal device receives the cryptographic package distributed from the cryptographic module distribution unit 352 of the server, and the information is registered as the own cryptographic module. The registration process includes additional registration of a cryptographic module to the cryptographic module DB 164 of the terminal device, and additional registration of the cryptographic module evaluation description in the cryptographic module evaluation DB 163 (step S248).

Here, the case of executing the selection procedures in the same specified conditions the next time is supposed. Since the new cryptographic module from the server has already been registered in the cryptographic module evaluation DB 163, when the specified condition is input, the newly registered cryptographic module is selected. That is, the operation of the third embodiment can be executed with the same specified conditions.

In the foregoing embodiments, the optimum cryptographic module conforming to the circumstance can be selected automatically without requiring any professional knowledge, solely by specifying the condition.

The foregoing embodiments may be applied not only to selection of a cryptographic module to be used by the own_terminal device, but also to selection of a cryptographic module most suited to the hardware of the terminal device by the server. The following two cases may be considered.

Figure 23:
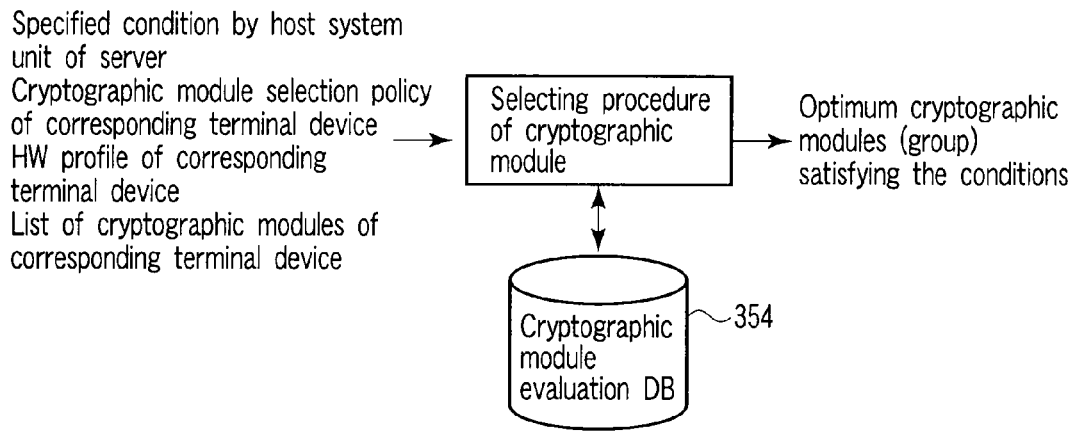
FIG. 23 is an example of data input and output to/from the cryptographic module selecting procedure when the cryptographic module to be held at the terminal side is selected and distributed by the initiative of the server side in the same embodiment.

(1) A case where the server selects the cryptographic module to be selected from the cryptographic module DB in the server, without accepting a selection request from the terminal device, and distributes the selected cryptographic module from the server to the terminal device:

If the selected cryptographic module is already present in the cryptographic module DB in the terminal device, the distribution from the server to the terminal device is not necessary, and thus it is not executed. For determining this condition, the terminal device sends the cryptographic module list of the terminal device to the server, in addition to the selection policy and hardware profile. The server refers to the cryptographic module evaluation DB 354 to select the cryptographic module, and checks if the selected cryptographic module is present in the cryptographic module list of the terminal device. Only when the selected cryptographic module is not present is the cryptographic module distributed from the server to the terminal device. The specified condition is not received from the terminal device, but is input from the server side application. An example of data input and output at this time is shown in FIG. 23.

(2) A case where the server receives a selection request from the terminal device, and selects the cryptographic module from the cryptographic module DB inside the terminal device, that is, a case where the terminal device requests only a selection process to the server: This is the process executed by the cryptographic management server device 1350 in the second embodiment.

Since the server performs a selection process in the terminal device in the third embodiment, the terminal device needs to send the cryptographic module list in the terminal device and the cryptographic module evaluation descriptions relating to the cryptographic modules in the cryptographic module list to the server, in addition to the selection policy, hardware profile and specified conditions. The distributed cryptographic module selecting unit 360 in the server operates in completely the same manner as the cryptographic module selecting unit in the terminal device in the third embodiment based on such data, and notifies the result of selection to the selecting unit of the terminal device.

In the foregoing embodiments, the cryptographic module extracting unit 202 and the cryptographic module reducing unit 203 are both provided, but either one of them may solely be provided. In the case where only the cryptographic module reducing unit 203 is provided without including the cryptographic module extracting unit 202, the cryptographic module reducing unit 203 reduces the cryptographic modules by referring to all cryptographic modules held in the machine.

As the embodiments of the present invention are described herein by referring to the accompanying drawings, the invention is not limited to the illustrated embodiments, and designs or the like that fall within the subject matter of the invention are included in the invention.

What is claimed is:

1. A cryptographic module selecting device which selects any one of a plurality of cryptographic modules, comprising:
   a cryptographic module evaluation information storage device configured to store identification information of a cryptographic module for executing a cryptographic method and cryptographic module evaluation information describing either one or both of a function and performance corresponding to the cryptographic module in relation to each other, the cryptographic module evaluation information being numerical information for indicating a security of the cryptographic method and a processing speed of the cryptographic module;

a condition information acquiring device configured to acquire condition information for specifying the condition of the cryptographic module to be selected, the condition including a condition input every time and a hardware profile, the condition input every time indicating the processing speed of the cryptographic module and a memory capacity necessary for execution of the cryptographic module;

an extracting device configured to extract cryptographic module evaluation information conforming to the condition information acquired by the condition information acquiring device, from the cryptographic module evaluation information stored in the cryptographic module evaluation information storage device; and an output device configured to read out the identification information of the cryptographic module corresponding to the cryptographic module evaluation information selected by the extracting device from the cryptographic module evaluation information storage device and output the read identification information;

wherein the condition information acquiring device acquires information to be the operating condition of a device for executing the cryptographic module stored in the device as the condition information, the operating condition including a function and performance of a hardware of the device for executing the cryptographic module, the hardware profile indicating an upper limit of a memory use in the hardware and processing speed of a CPU;

the extracting device compares items of cryptographic module evaluation information from a set of cryptographic module evaluation information items in the cryptographic module evaluation information storage device, determines data most suited to the condition information acquired by the condition information acquiring device, and reduces the cryptographic modules to the one most suited to the condition.

2. The cryptographic module selecting device according to claim 1, further comprising a cryptographic module management device configured to execute and operate the cryptographic module corresponding to the identification information of the cryptographic module output from the output device.

3. The cryptographic module selecting device according to claim 1, wherein the extracting device determines, for every cryptographic module evaluation information in the cryptographic module evaluation information storage device, whether or not the cryptographic module evaluation information conforms to the condition information acquired by the condition information acquiring device, and extracts the conforming cryptographic module evaluation information.

4. The cryptographic module selecting device according to claim 1, wherein the extracting device determines, for every cryptographic module evaluation information in the cryptographic module evaluation information storage device, whether or not the cryptographic module evaluation information conforms to the condition information acquired by the condition information acquiring device, and extracts the conforming cryptographic module evaluation information.

5. The cryptographic module selecting device according to claim 1, wherein the extracting device determines, for every cryptographic module evaluation information in the cryptographic module evaluation information storage device, whether or not the cryptographic module evaluation information conforms to the condition information acquired by the condition information acquiring device, and extracts the conforming cryptographic module evaluation information.

6. The cryptographic module selecting device according to claim 1, further comprising:

a search request device configured to transmit the condition of the cryptographic module to an external device connected to the cryptographic module selecting device to instruct a search request of the cryptographic module when cryptographic module evaluation information conforming to the condition of the cryptographic module is not present in selecting the cryptographic module evaluation information conforming to the condition of the cryptographic module by the extracting device; and a receiving device configured to receive the identification information of the cryptographic module searched according to the search request from the search request device.

7. The cryptographic module selecting device according to claim 1, wherein the extracting device transmits cryptographic method information included in the cryptographic module evaluation information when extracting the cryptographic module evaluation information conforming to the acquired condition information to a second cryptographic module selecting device connected to the cryptographic module selecting device, and the second cryptographic module selecting device selects the conforming cryptographic module corresponding to the cryptographic method.

8. The cryptographic module selecting device according to claim 2, wherein the extracting device determines, for every cryptographic module evaluation information in the cryptographic module evaluation information storage device, whether or not the cryptographic module evaluation information conforms to the condition information acquired by the condition information acquiring device, and extracts the conforming cryptographic module evaluation information.

9. A non-transitory computer-readable recording medium used in a cryptographic module selecting device for selecting any one of a plurality of cryptographic modules, comprising:

a first computer executable code for making the cryptographic module selecting device sequentially execute the process of storing identification information of a cryptographic module for executing a cryptographic method and cryptographic module evaluation information describing either one or both of a function and performance corresponding to the cryptographic module in a cryptographic module evaluation information storage device in relation to each other, the cryptographic module evaluation information being numerical information for indicating a security of the cryptographic method and a processing speed of the cryptographic module;

a second computer executable code for making the cryptographic module selecting device sequentially execute the process of acquiring condition information for specifying the condition of the cryptographic module to be selected, the condition indicating a condition input every time and a hardware profile, the condition input every time indicating the processing speed of the cryptographic module and a memory capacity necessary for execution of the cryptographic module;

a third computer executable code for making the cryptographic module selecting device sequentially execute the process of extracting cryptographic module evaluation information conforming to the acquired condition information from the cryptographic module evaluation information of the cryptographic module stored in the cryptographic module evaluation information storage device; and a fourth computer executable code for making the cryptographic module selecting device execute the process of reading out the identification information of the cryptographic module corresponding to the cryptographic module evaluation information selected by the extracting process and output the read identification information;

wherein the condition information acquiring process acquires information to be the operating condition of a device for executing the cryptographic module stored in the device as the condition information, the operating condition including a function and performance of a hardware of the device for executing the cryptographic module, the hardware profile indicating an upper limit of a memory use in the hardware and processing speed of a CPU;

the extracting process compares items of cryptographic module evaluation information from a set of cryptographic module evaluation information items in the cryptographic module evaluation information storage device, determines data most suited to the condition information acquired by the condition information acquiring device, and reduces the cryptographic modules to the one most suited to the condition.

* * * * *